United States Patent [19]
Serita et al.

[11] Patent Number: 5,255,138
[45] Date of Patent: Oct. 19, 1993

[54] AUTOMATIC DISK CHANGER

[75] Inventors: Kaoru Serita; Masaaki Kiyomiya; Jun Takahashi; Masaki Iwamoto; Masatoshi Watanabe, all of Saitama, Japan

[73] Assignee: Pioneer Electronic Corporation, Tokyo, Japan

[21] Appl. No.: 895,233

[22] Filed: Jun. 8, 1992

Related U.S. Application Data

[63] Continuation of Ser. No. 473,259, Jan. 31, 1990, abandoned.

[30] Foreign Application Priority Data

Jan. 31, 1989 [JP] Japan .............................. 1-19553
Jan. 31, 1989 [JP] Japan .............................. 1-19554
Jan. 31, 1989 [JP] Japan .............................. 1-19555

[51] Int. Cl.$^5$ ............................................ G11B 17/08
[52] U.S. Cl. ............................. 360/98.04; 360/98.06
[58] Field of Search ............... 360/98.06, 98.04, 92; 369/191-192

[56] References Cited

U.S. PATENT DOCUMENTS

| 4,695,903 | 9/1987 | Serap | 360/92 |
| 4,779,151 | 10/1988 | Lind | 360/92 |
| 5,001,582 | 3/1991 | Numasaki | 360/98.06 |

Primary Examiner—A. J. Heinz
Attorney, Agent, or Firm—Sughrue, Mion, Zinn, Macpeak & Seas

[57] ABSTRACT

An automatic disk changer is disclosed in which a tray transfer mechanism is provided in a case at the central portion of the width thereof so that the mechanism can be moved up and down. A disk player is installed to play a disk optionally transferred by the mechanism. Pairs of right and left tray guides for housing trays are provided in the case at the right and left portions thereof so that the center lines of the guides extend toward the mechanism.

9 Claims, 24 Drawing Sheets

AUTOMATIC DISK CHANGER

This is a continuation of application Ser. No. 07/473,259 filed Jan. 31, 1990 now abandoned.

BACKGROUND OF THE INVENTION

The present invention relates to an automatic disk changer which houses a large number of disks, such as a video disk and a compact disk, and is manipulated outside to choose a desired one of the disks to play the chosen disk.

In a conventional automatic disk changer of such kind, pairs of guide grooves are provided on a large number of levels at one side portion of a case or at both the sides of a conveyance means, and trays containing disks are inserted in the guide grooves so that the trays can be pulled out from the grooves. A player for playing each of the disks is installed in the case at the upper or lower portion thereof. Each of the trays containing the disks can be pulled out from the guide groove by the conveyance means movable back and forth between the player and the trays and then be conveyed to the player by the conveyance means so as to be played by the player.

Since the disks are piled up in a column at one side portion of the case of the conventional automatic disk changer or in columns at both the sides of the conveyance means, there are problems that the number of the disks which can be housed in the changer is relatively limited and the width of the case is very large. To pull out the tray from each tray guide and convey the pulled-out tray to the disk player, the depth of the case needs to be made not less than the sum of the depth of the tray housed in the tray guide and that of the tray pulled out therefrom. For that reason, there is a problem that the depth of the case is large. If the large number of disks are to be housed in the case limited in width and depth, the disks can be only piled up therein. For that reason, the height of the case is so large that there are problems that it is troublesome to newly place another disk in the case and the length of the movement of the conveyance means is large to make it time-consuming to convey each of the disks to the disk player after choosing the disk.

Also, in a conventional automatic disk changer, disks are set to or played by a player arranged in an upper or lower portion of a case. Therefore, unless the play of the set disk is completed or finished, it is impossible to perform a preparatory operation for the next disk. It takes a long time to perform the preparatory operation from the end of the play of the first disk to the start of the play of the second disk.

On the other hand, in the conventional automatic disk changer, when the tray is pulled from the tray guide or when the pulled tray is inserted into the disk player, it is necessary to exactly align the tray transfer means and the tray guide with each other or the tray transfer means and the disk player with each other. If this is not the case, it is impossible to transfer the tray as desired. Namely, it is necessary to move the tray transfer means up and down. Accordingly, it is necessary to make the case of strong material in order to prevent the guide rails for supporting the tray transfer means from inclining.

However, in order to prevent the inclination of the guide rails, it is necessary to use a number of connecting members and components having a large thickness. This leads to the increase of the weight of the changer and of the manufacturing cost thereof.

SUMMARY OF THE INVENTION

The present invention was made in order to solve the above-mentioned problems.

Accordingly, it is an object of the present invention to provide an automatic disk changer which has a case capable of housing twice as many disks than a conventional case of the same width and height as the former and has a disk transfer means by which each disk can be set on a disk player at the same speed as a conventional automatic disk changer.

The automatic disk changer provided in accordance with the present invention is characterized in that the tray transfer means is provided in the tray transfer case at the central portion of the width thereof so that the means can be moved up and down; the disk player is installed to play a chosen disk transferred by the tray transfer means; and pairs of right and left tray guides for housing trays are provided on a large number of levels in the case at the right and left portions thereof so that the center lines of the right and the tray transfer left tray guides extend toward the means.

According to the invention, there is provided an automatic disk changer characterized in that a tray transfer means is provided in a case so that said tray transfer means can be moved up and down; two disk players are installed to alternately play disks in trays optionally transferred by said tray transfer means; tray guides are provided on a large number of levels in said case so as to guide said trays being pulled out or put in by said tray transfer means; and one of said disks can be prepared for playback by one of said players while another of said disks is being played by the other of said players.

According to the invention, there is provided an automatic disk changer characterized in that a tray transfer means is provided in a case at the central portion of the width thereof so that said tray transfer means can be moved up and down; two disk players are installed to play disks in trays optionally transferred by said tray transfer means; pairs of right and left tray guides are provided on a large number of levels in said case at the right and left portions thereof so that the center lines of said guides extend toward said tray transfer means; and one of said disks can be prepared for playback by one of said players while another of said disks is being played by the other of said players.

According to another aspect of the invention, there is provided an automatic disk changer characterized in that tray guides are provided on a large number of levels in order to house trays containing disks; a pair of guide rails are provided at both the side portions of a case; a tray transfer means, including a pair of right and a pair of left guide rollers provided at sides of said rails, and right and left guide rollers, are put into elastic contact with said rails in directions perpendicular to the former pair of right and left guide rollers, is provided to pull out said tray from said tray guide and then transfer said tray; timing belts are endlessly wound at both the sides of said case and secured at the central portions of said belts to said tray transfer means; and a disk player is installed to play said disk in said tray optionally transferred by said tray transfer means.

DESCRIPTION OF THE PREFERRED EMBODIMENTS

An embodiment of the present invention is hereafter described with reference to the drawings attached hereto.

Figure 1:
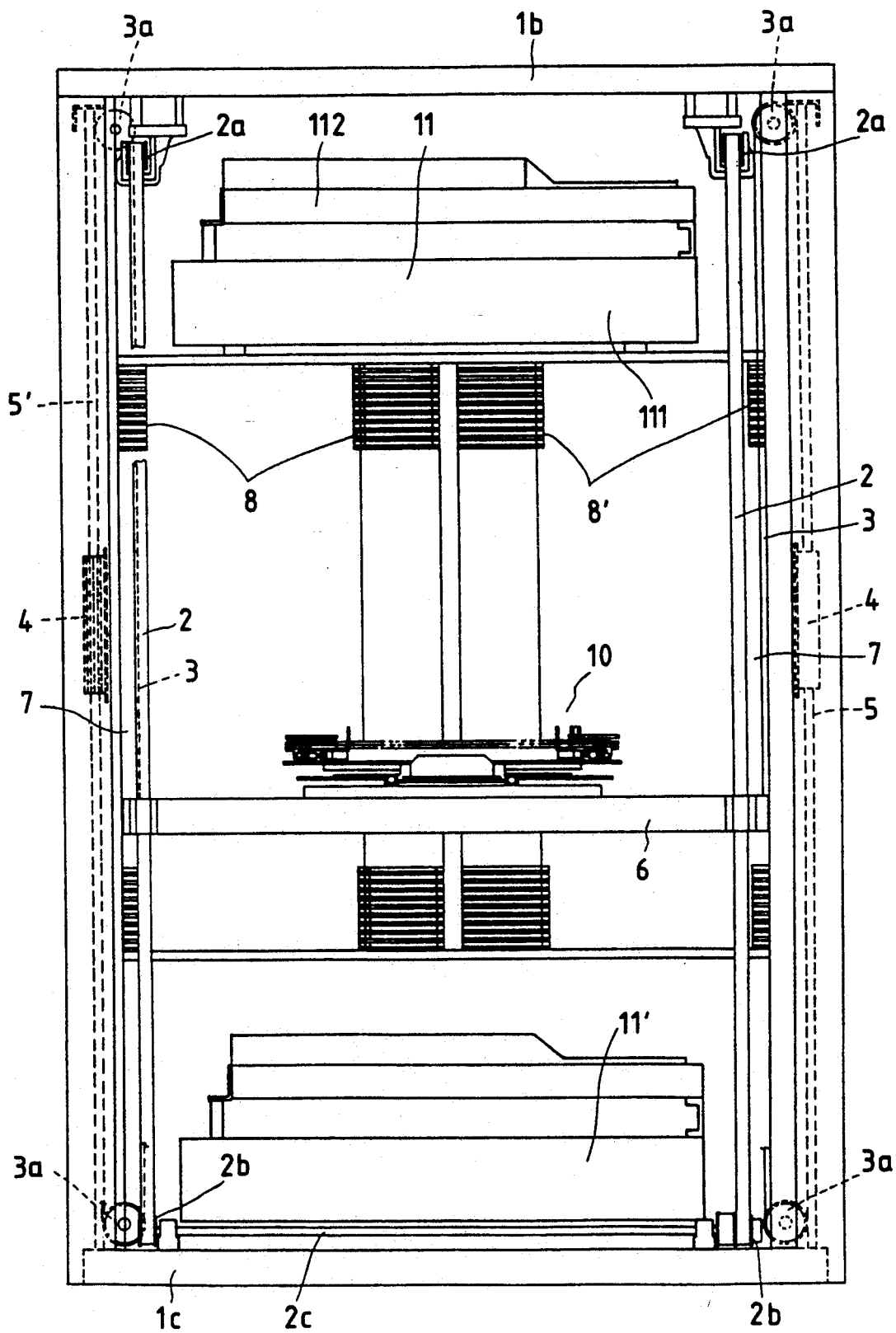
FIG. 1 is a front view of an automatic disk changer which is an embodiment of the present invention.
Figure 2:
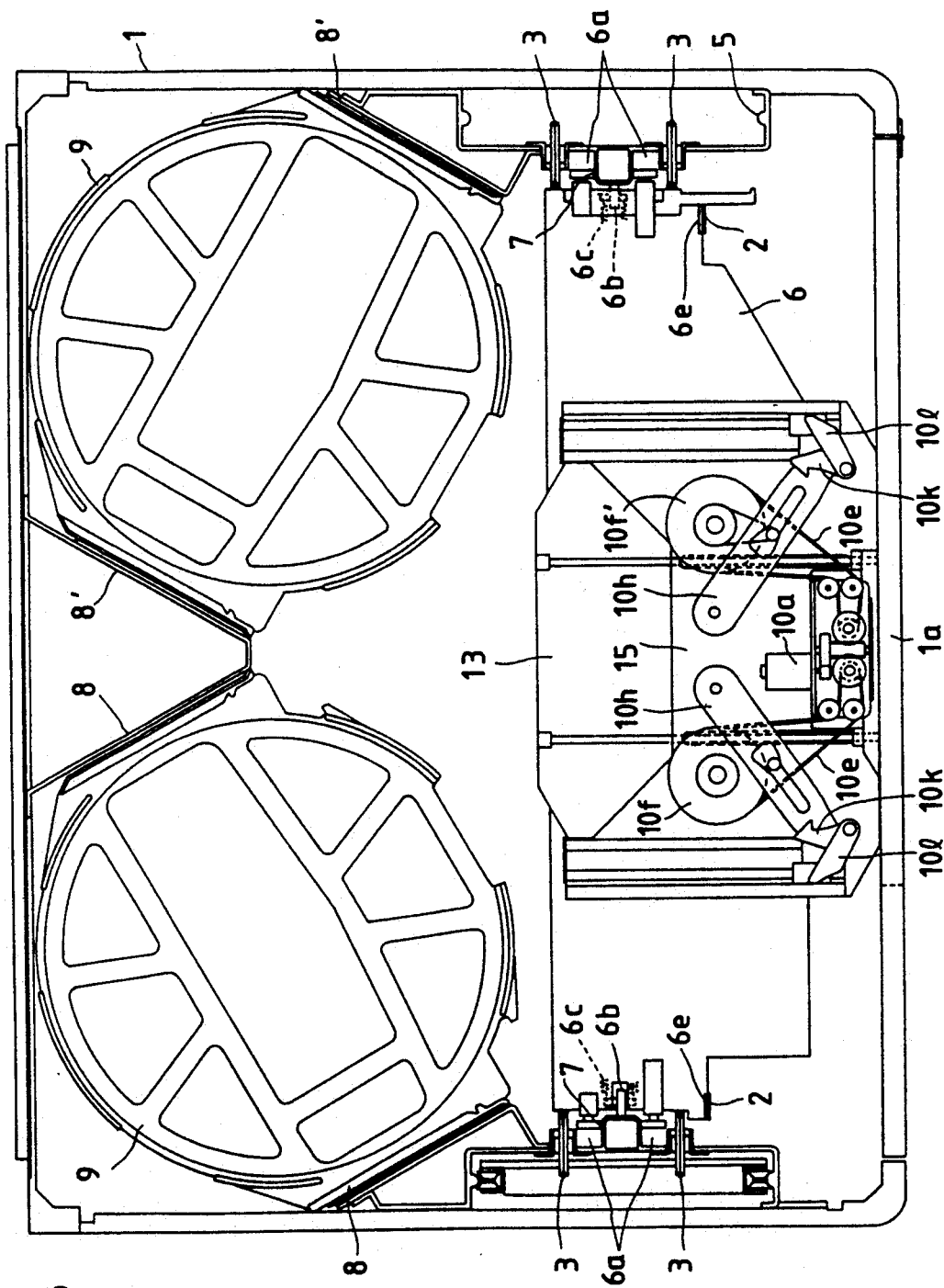
FIG. 2 is a plan view of the changer.
Figure 3:
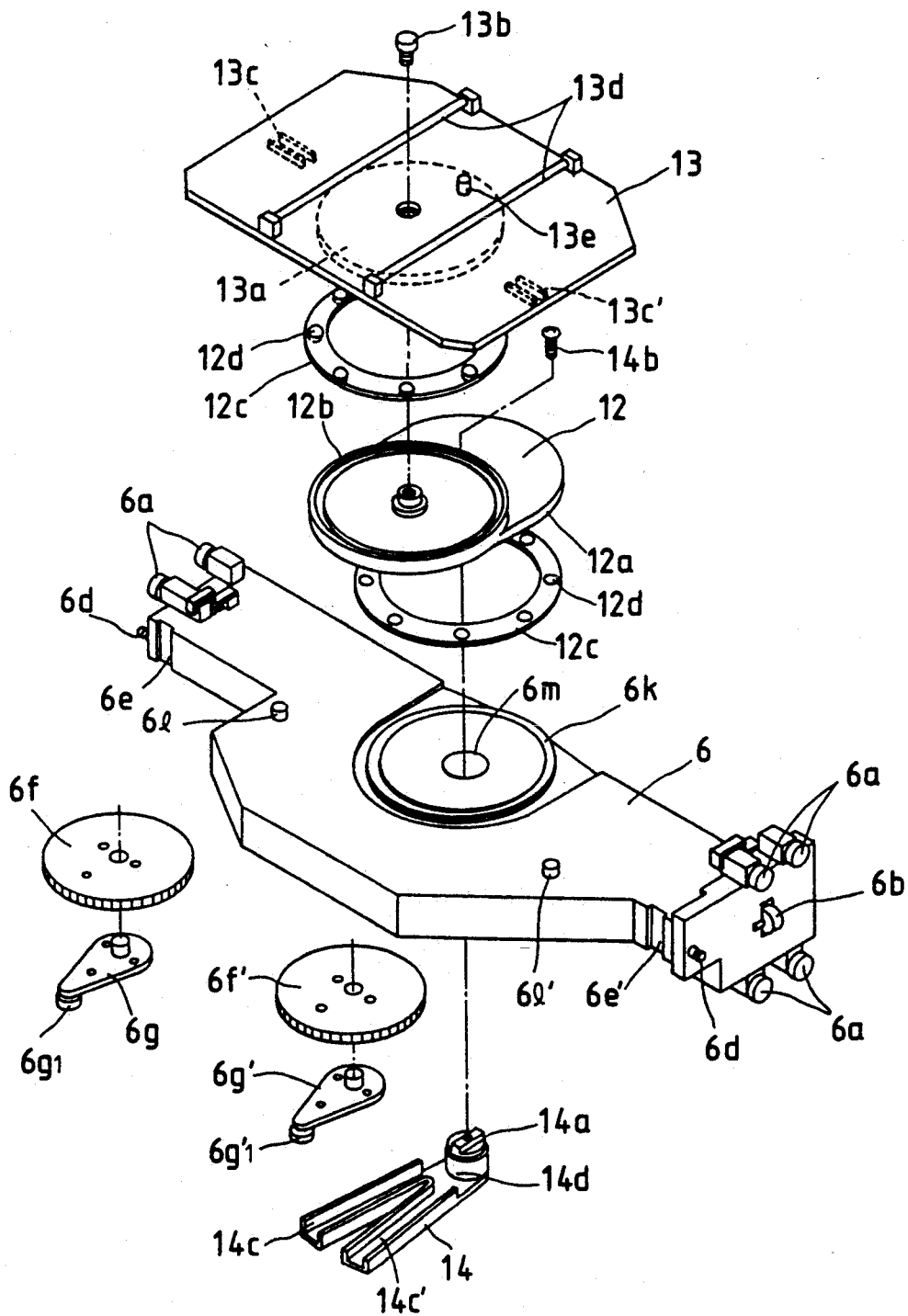
FIG. 3 is a partial perspective exploded view of the disk transfer means of the changer.

FIG. 1 is a front view of an automatic disk changer which is the embodiment. FIG. 2 is a plan view of the automatic disk changer. The changer includes a case 1, a pair of timing belts 2, endless wires 3, weights 4, guide rails 5, a moving rest 6, and guide rails 7. The case 1 is fitted with a door 1a openable forward. The timing belts 2 are wound on right and left timing pulleys 2a supported at the top plate 1b of the case 1, and right and left timing pulleys 2b supported at the bottom plate 1c of the case. The timing belts 2 are connected to each other by a single shaft 2c so that the belts are revolved synchronously with each other when the shaft is rotated by a motor not shown in the drawings. The endless wires 3 are wound on right and left pulleys 3a supported at the top plate 1b and the bottom plate 1c. The weights 4 are secured to the ends of the wires 3 so that the weights are balanced to the moving rest 6. When the wires 3 are revolved, the weights 4 are moved while being guided by the guide rails 5 secured to the case 1. The moving rest 6 is moved while being guided by the guide rails 7 extending in parallel with the other guide rails 5. The rest 6 is coupled to the timing belts 2 and the portions of the wires 3 opposite the other portions thereof, to which the weights 4 are secured. The rest 6 is moved while being guide by the guide rails 7 as shown in FIGS. 2 and 3. Eight guide rollers 6a and two guide rollers 6b are attached to the moving rest 6 at both the ends thereof so that the guide rollers 6a are located on the fronts and rears of the guide rails 7 and the other guide rollers 6b are located on the sides of the rails. The guide rollers 6b are urged by springs 6c so that the moving rest 6 does not move either rightward or leftward relative to the guide rails 7 because of a clearance. The wires 3 are anchored to projections 6d provided on the end faces of the moving rest 6. The timing belts 2 are secured to the rest 6 in the groove 6e thereof.

Moving the rest 6 up and down is described in detail from now on. When the motor not shown in the drawings is driven, the shaft 2c is rotated to revolve the timing belts 2 to move the rest 6 up or down depending on the direction of the rotation of the motor while the rest is guided by the guide rails 7. At that time, since the weights 4 secured to the wires 3 anchored to the rest 6 are balanced to the rest, the rest is smoothly moved up or down even if the torque of the motor is not high.

Tray guides 8 and 8' are provided on a large number of levels in the case 1 at the posterior portion thereof so that the angle between the center lines of the tray guides 8 and 8' is about 60 degrees. Each of the tray guides 8 and 8' consists of a pair of right and left rails for guiding a tray 9 described hereinafter. The mutually facing sides of the rails of each of the tray guides 8 and 8' have grooves, into which the side edges of the tray 9 are inserted so that the side edges can be pulled out from the grooves.

A tray transfer means 10 is provided on the top of the moving rest 6. The tray transfer means 10 functions so that the tray 9 is pulled out from the tray guide 8 or 8' and then transferred to one of disk players 11 and 11' installed in the case 1 at the upper and lower portions thereof. The tray transfer means 10 also functions so that the tray 9 containing a disk D having been played by the disk player 11 or 11' is transferred back to the prescribed tray guide 8 or 8'.

Figure 4:
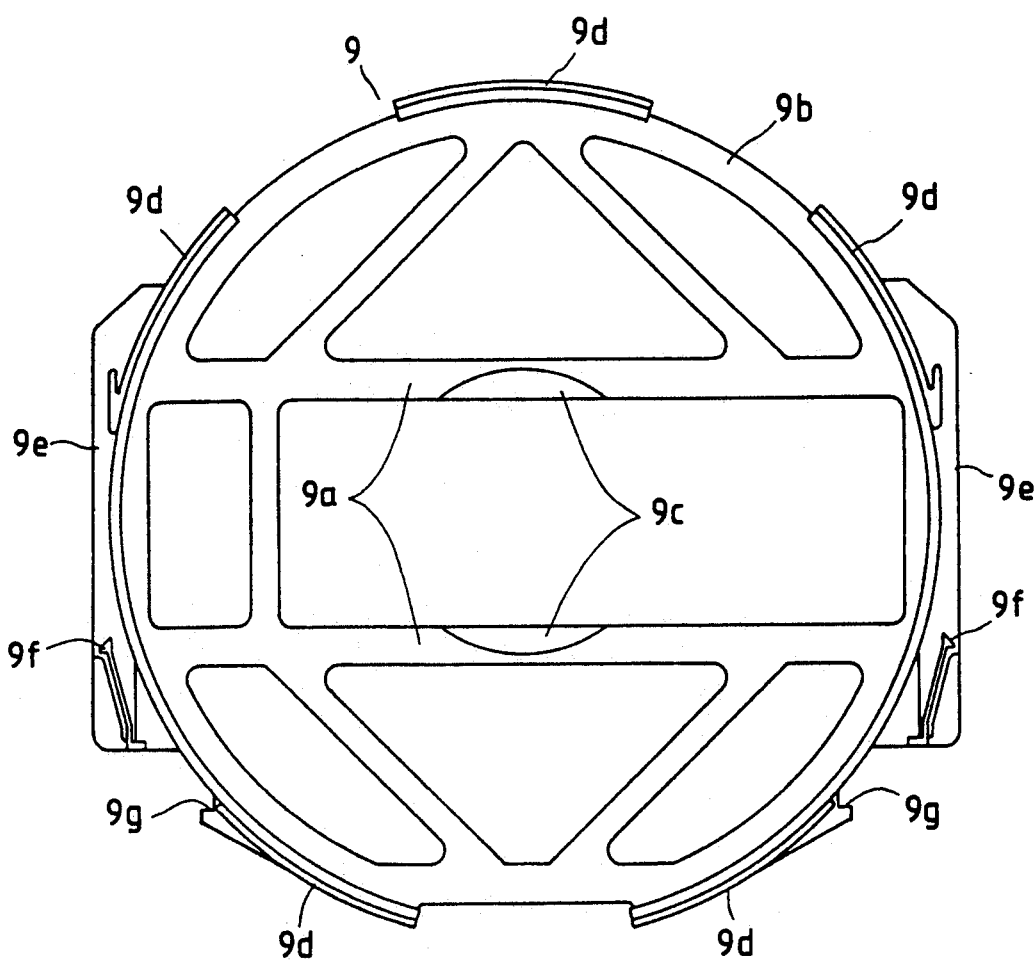
FIG. 4 is a plan view of the tray of the changer.
Figure 8:
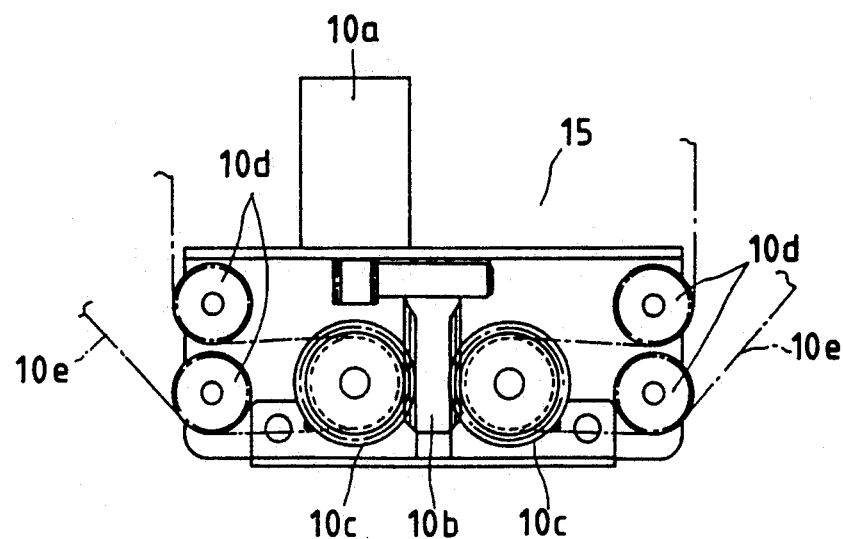
FIG. 8 is a partial enlarged plan view of the part shown in FIG. 7.

The tray 9 is now described in detail with reference to FIG. 4. The tray 9 has such a size that the disk D of 30 cm in diameter, for example, is contained in the tray. The tray 9 is made from a steel plate of enough rigidity, which is punched to have only a plurality of slender portions to decrease the weight of the tray. The central slender portions 9a and peripheral slender portions 9b of the tray 9 are integrally formed with protective portions 9c and 9d which are located in prescribed positions and made of a synthetic resin to prevent the disk D from coming into contact with the steel body of the tray so as to be scratched or damaged. The protective portions 9d on the peripheral slender portions 9b have vertical projections for guiding the disk D, and are formed with projections 9e in mutually opposite positions so that the projections are inserted into the tray guide 8 or 8'. The peripheral slender portions 9b are also formed with elastic engagement lugs 9f, which are engaged with the projections 8a of the tray guide 8 or 8'. The projective portions 9d on the peripheral slender portions 9b are formed with hooks 9g, which are engaged with the engagement arms 10k of the tray transfer means 10.

A mechanism for pulling out the tray 9 from the tray guide 8 or 8' and then setting the tray in the disk player 11 or 11' and for pulling out the tray from the player and returning the tray to the tray guide is described in detail with reference to FIGS. 2, 3, 5, 6, 7, 8, 9, 10, 11, 12, 13 and 14 from now on. Two gears 6f and 6f', to the bottoms of which swing arms 6g and 6g' are secured, are supported under the moving rest 6 and engaged with the smaller gear of a double gear unit 6h whose larger gear is engaged with a worm 6j, which is rotated by a motor 6i secured to the bottom of the moving rest.

When the motor 6i is driven, the gears 6f and 6f' are rotated in the same direction as each other through the worm 6j and the double gear unit 6h. The top of the moving rest 6 has an annular recess 6k between a pair of projections 6l and 6l'. A rotary circular plate unit 12 consists of two circular plates integrally and eccentrically conjoined to each other and having annular projections 12a and 12b on the obverse sides of the plates so that the annular projection 12a is fitted in the annular recess 6k of the moving rest 6 and the other annular projection 12b is fitted in the annular recess 13a of the bottom of a swing plate 13 described hereinafter. The circular plate having the annular projection 12a fitted in the annular recess 6k of the top of the moving rest 6 is rotatably coupled, by a screw 14b, to the pivot 14a of a swing member 14, which is inserted into the center hole 6m of the moving rest from under it. The swing plate 13, in the annular recess 13a of which the annular projection 12b of the top of the rotary circular plate unit 12 is fitted, is secured thereto by a screw 13b inserted into the swing plate from over it. The swing plate 13 has guide grooves 13c and 13c, in the right and left portions of the bottom thereof. The projections 6l and 6l' of the moving rest 6 are optionally inserted into the guide grooves 13c and 13c' so that the rest is guided by the grooves. The swing plate 13 is provided with a pair of guide bars 13d extending in parallel with each other on the top of the plate. A retainer 2c is provided between the moving rest 6 and the rotary circular plate unit 12 along the annular projection 12a thereof. Another retainer 12c is provided between the swing plate 13 and the rotary circular plate unit 12 along the annular projection 12b thereof. Balls 12d are fitted in the holes of the retainers 12c. The swing member 14, whose pivot 14a is secured to the rotary circular plate unit 12 by the screw 14b, has a notch 14d near the pivot, and a pair of guide grooves 14c' extending in mutually different directions from the notch. Rollers 6g1 and 6g'1 provided on the swing arm 6g and 6g' at the tips thereof are optionally inserted into the guide grooves 14c and 14c' so that the rollers are guided. The pivot 14a is formed with a flange 14e extending by about 180 degrees in angle along the circumference of the pivot. Three switches S1, S2 and S3 are disposed at angular intervals of about 90 degrees each so that the switches are turned on when they come into contact with flange 14e.

The tray transfer means 10 is provided on the top of a moving plate 15, which is moved backward and forward while being guided by the guide bars 13d of the swing plate 13. The tray transfer means 10 includes a motor 10a, a worm 10b, a pair of gears 10c, two pulleys 10d, belts 10e, a pair of large pulleys 10f, swing arms 10g, and a tray gripping means which comprises a pair of control arms 10h, a moving arm 10i, moving members 10j, the engagement arms 10k, return arms 10l, wound springs 10m, and rods 10n. The motor 10a is secured to the moving plate 15. The worm 10b has two spiral grooves, and is rotated by the motor 10a. The gears 10c are engaged with the worm 10b at both the sides thereof. The belts 10e are wound on pulleys formed on the gears 10c, the pulleys 10d and the large pulleys 10f so that the gears are connected to the large pulleys. The swing arms 10g are secured to the large pulleys 10f. Each of the control arms 10h are supported at one end thereof by the moving plate 15. Rollers 10g' on the swing arms 10g are fitted in slender holes 10h' slenderly extending in the control arms 10h in the longitudinal directions thereof. One end of the moving arm 10i is swung, under the moving plate 15, together with one of the control arms 10h. The other end of the moving arm 10i is engaged with the projection 13e of the swing plate 13. The moving member 10j is engaged with the tips of the control arms 10h, and guided by two pairs of guide bars 15a provided on the right and left portions of the moving plate 15. The engagement arms 10k and the return arms 10l are rotatably supported by pins 10j'' planted in the moving members 10j. The left-hand engagement arm 10k and the left-hand return arm 10l are urged clockwise by one of the wound springs 10m, while the right-hand engagement arm 10k and the right-hand return arm 10l are urged counterclockwise by the other of the springs. The rods 10n are supported by the moving members 10j slidably relative thereto, and are urged by springs 10n' in such directions as to move the moving members 10j forward. Projections 10k' provided on the tops of the engagement arms 10k are engaged with projections 10l' provided on the bottoms of the return arms 10l. Projections 10l'' provided on the bottoms of the return arms 10l are engaged with the front ends of the rods 10n. Since the projections 10l'' of the return arms 10l are in contact with the front ends of the rods 10n and the projections 10k' of the engagement arms 10k are in contact with the projections 10l' of the return arms 10l, the swinging forces of the wound springs 10m are controlled so that the tray transfer means 10 is put in a state shown in FIG. 7. Disengaging pins 10o for disengaging the elastic engagement lugs 9f of the tray 9 from the projections 8a of the tray guide 8 or 8' when the pins come into contact with the lugs project from the moving members 10j so that the tips of the pins are located behind those of the rods 10n. Guide grooves 15b for guiding the tray 9 are provided in the moving plate 15 along both the side edges thereof. Restrictors 15c, which are freely turnable backward but not turnable forward, are attached to the top of the moving plate 15 and located in the rear half portions of the guide grooves 15b so that the restrictors are engaged with the return arms 10l when the tray 9 is returned to the tray guide 8 or 8' provided in the case 1.

Transferring the tray 9 is described in detail from now on. Before the transferring of the tray 9 is started, the automatic disk changer is in a state shown in FIG. 5. In that state, the rollers 6g1 and 6g1' on the swing arms 6g and 6g' remain inserted in the guide grooves 14c and 14c' of the swing member 14 in the central position thereof, the projections 6l and 6l' provided on the moving rest 6 remain inserted in the guide grooves 13c and 13c' provided in the bottom of the swing plate 13, and the switch S2 remains turned on by the flange 14e. When electric power is then applied to the motor 6i so that the gears 6f and 6f' are rotated clockwise with regard to FIG. 6, the swing arm 6g remains inserted in the guide groove 14c of the swing member 14 and the other swing arm 6g' is moved out from the guide groove 14c of the swing member so that the member is swung clockwise by the swing arm 6g. At that time, the projection 6l remains inserted in the guide groove 13c, and the other projection 6l' is moved out from the guide groove 13c'. As a result, the swing plate 13 is swung clockwise on the rotary circular plate unit 12 relative to the moving rest 6 about the engaged portions of the projection 6l and the guide groove 13c. When the swing member 14 is swung by an angle of about 90 degrees so that the switch S3 is turned on by the flange 14e, the application of the electric power to the motor 6i is ceased so that the swing plate 13 is stopped in a swung position shown in FIG. 6. If the gears 6f and 6f' are rotated counterclockwise with regard to FIG. 6 by the reverse rotation of the motor 6i, the swing member 14 is swung counterclockwise so that the swing plate 13 is swung clockwise about the engaged portions of the projection 6l' and the guide groove 13c'. When the swing plate 13 is thus swung counterclockwise or clockwise, the plate is opposed to the tray 9 inserted in the tray guide 8 or 8' in the case 1.

Figure 9:
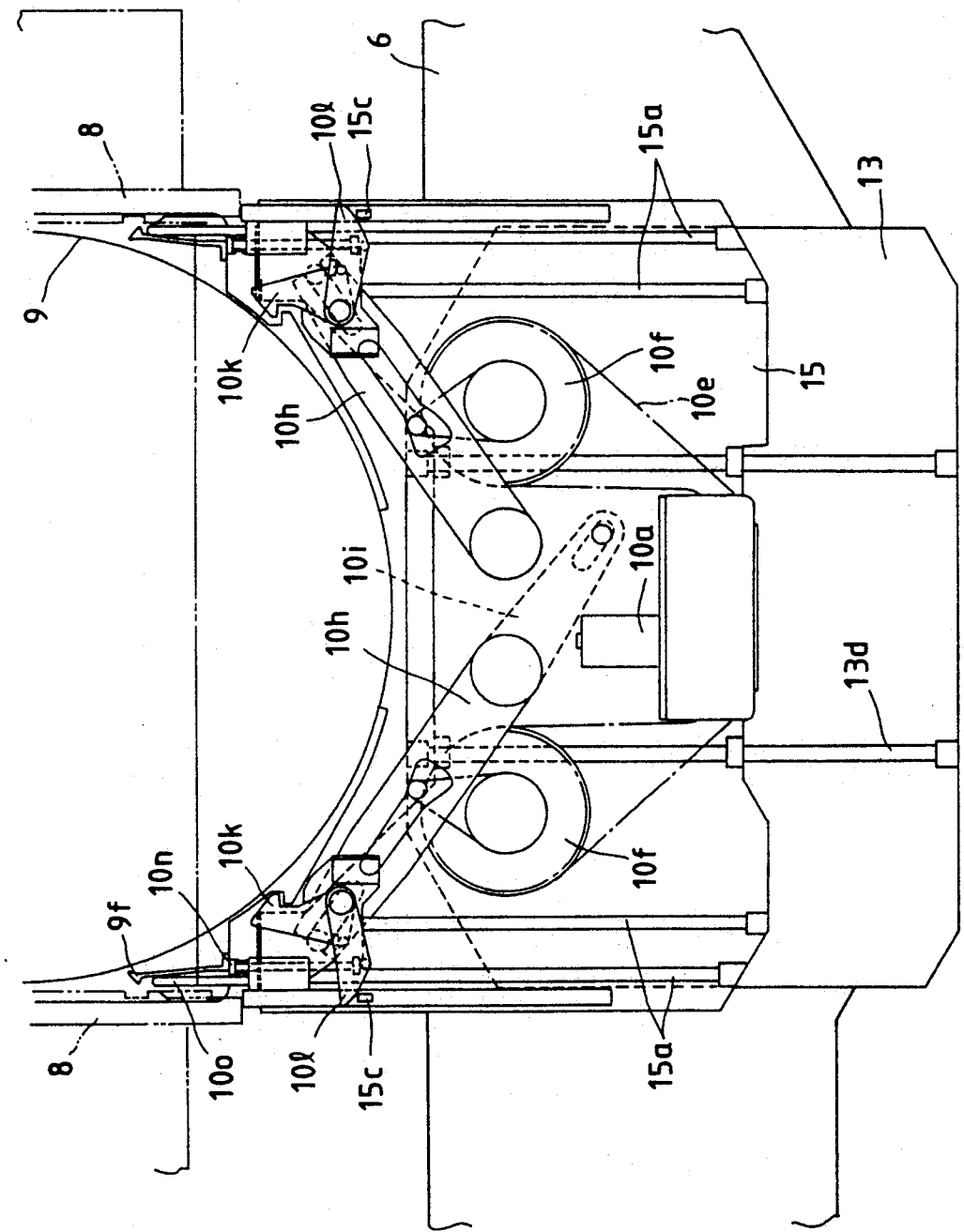
FIGS. 9, 10 and 11 are plan views of the part in moved states.

When the switch $S_3$ is turned on so that the swing plate 13 is stopped as mentioned above, electric power is applied to the motor 10a so that the double-grooved worm 10b is rotated. As a result, the gears 10c are rotated so that the large pulleys 10f are rotated, in directions shown in FIG. 7, by the belts 10e wound on the pulleys formed on the gears 10c. The worm 10b is provided with the two spiral grooves so that the gears 10c engaged with the worm are rotated synchronously with each other. Since the large pulleys 10f are thus rotated, the swing arms 10g secured thereto are swung in the same directions as the rotation of the pulleys so that the pair of control arms 10h and the moving arm 10i are swung. When the moving arm 10i is swung counterclockwise with regard to FIG. 7, the moving plate 15 is moved backward to the vicinity of the tray 9 inserted in the tray guide 8 or 8' in the case 1, while being guided by the guide bars 13d, because the tip of the moving arm is engaged with the projection 13e of the swing plate 13. When the pair of control arms 10h are swung in the same direction as the swing arm 10g, the moving members 10j engaged with the tips of the control arms 10h are moved backward while being guided by the guide bars 15a. The end of the backward movement is shown in FIG. 9. Immediately before the end of the backward movement of the moving members 10j, the disengaging pins 10o come into contact with the elastic engagement lugs 9f of the tray 9 to disengage the lugs from the projections 8a of the tray guide 8 or 8', and the rods 10n come into contact with the projections 9e of the tray 9 and move forward against the forces of the springs 10n' to swing the return arms 10l against the forces of the wound springs 10m. At that time, the engagement arms 10k once come into contact with the hooks 9g of the tray 9 and are then swung against the forces of the wound springs 10m and thereafter engaged with the hooks as shown in FIG. 9.

Figure 10:
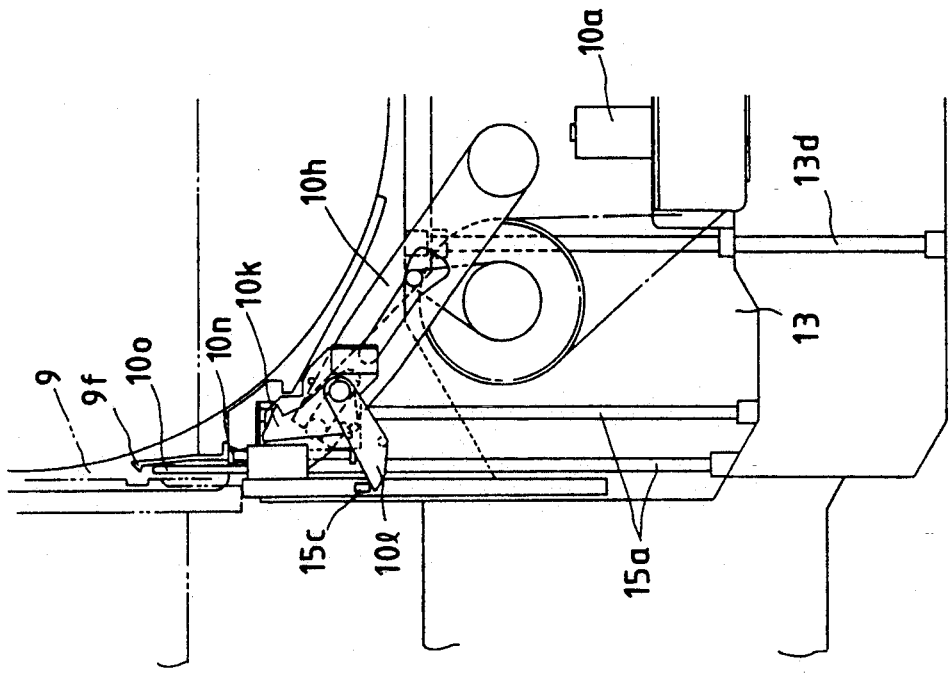
Figure 12:
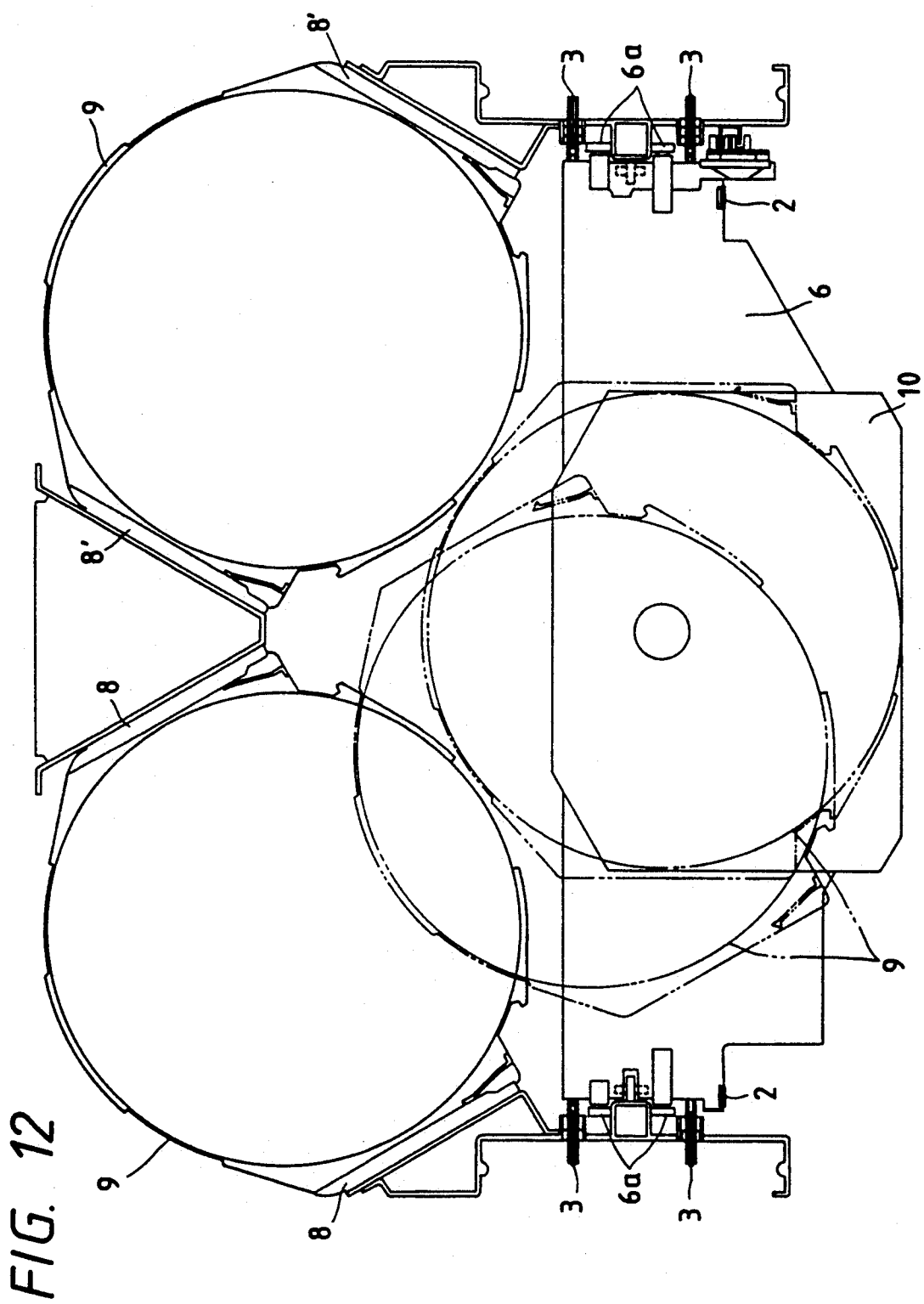
FIGS. 12, 13 and 14 are plan views of a disk transferred by the means.
Figure 13:
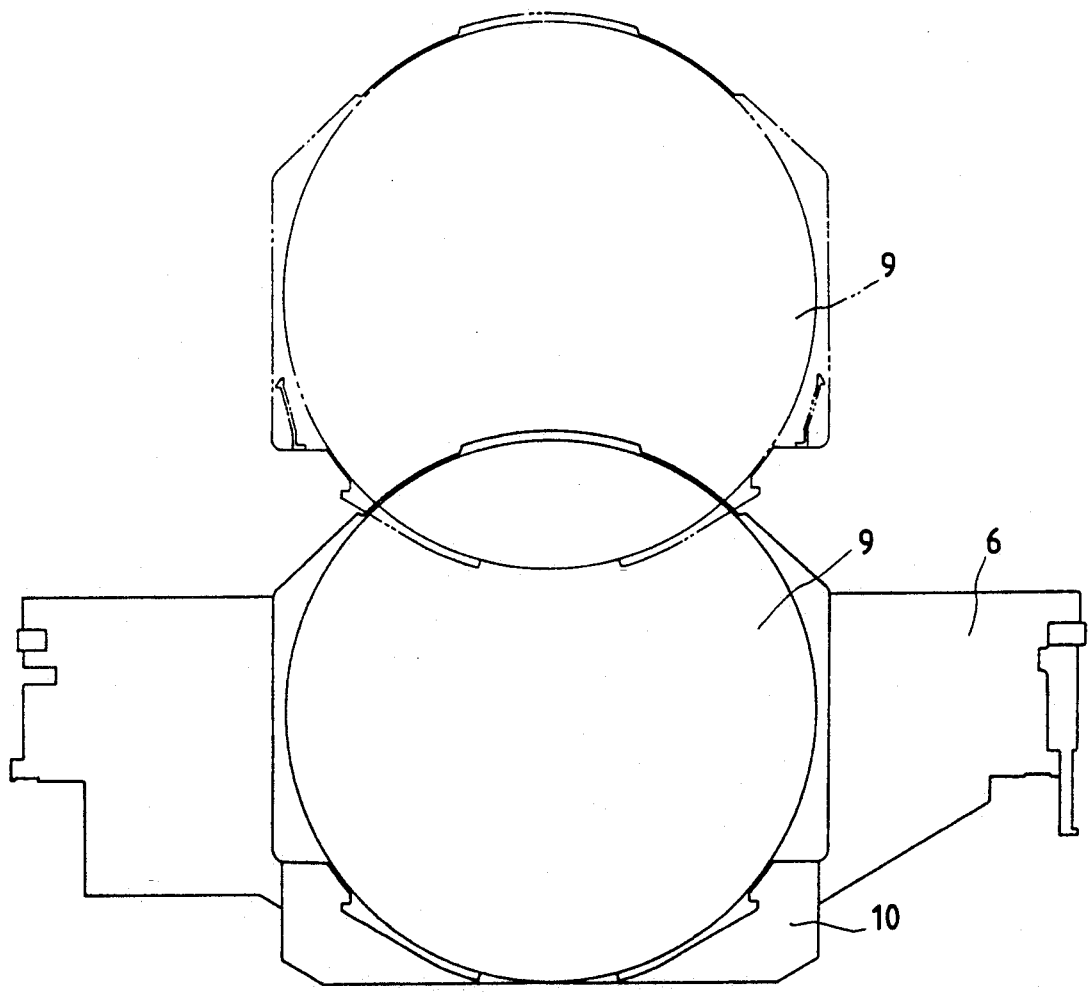

After the completion of the backward movement of the moving members 10j is detected by a switch not shown in the drawings, the motor 10a is once stopped and then rotated in reverse so that the moving plate 15 and the moving members 10j are moved forward. At the time of the forward movement of the moving members 10j, the engagement arms 10k are already engaged with the hooks 9g of the tray 9, and the elastic engagement lugs 9f of the tray are already disengaged from the projections 8a of the tray guide 8 or 8' by the disengaging pins 10o having come into contact with the lugs. For that reason, the moving plate 15 and the moving members 10j are moved forward to the original positions thereof as shown in FIGS. 10 and 12, while pulling out the tray 9 from the tray guide 8 or 8' into the guide grooves 15b of the moving plate. Although the return arms 10l come into contact with the restrictors 15c in the guide grooves 15b of the moving plate 15 during the forward movement of the moving members 10j, the return arms pass by the restrictors while turning them forward, because the restrictors are turnable forward as mentioned above.

Figure 5:
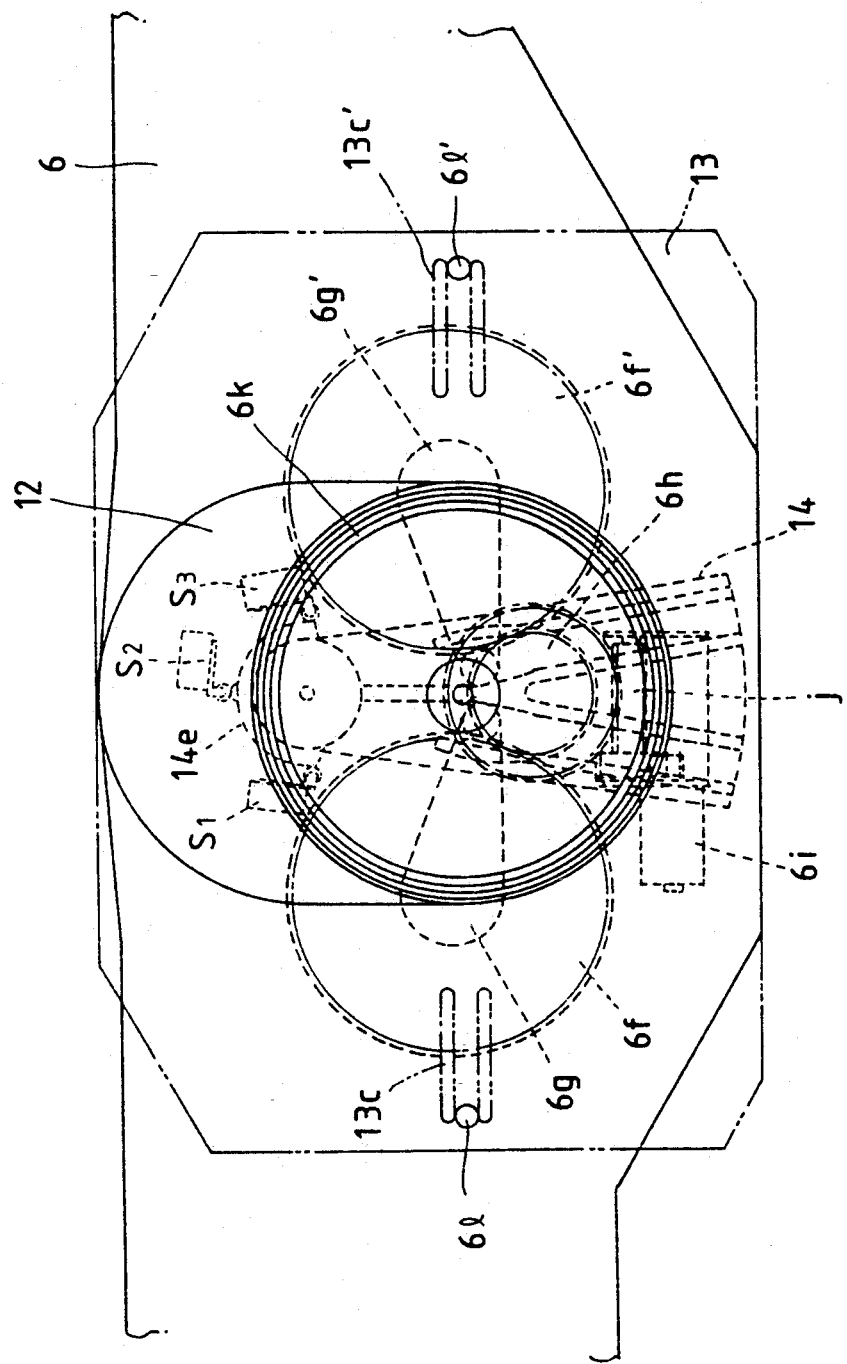
FIG. 5 is a plan view of a part of the means.
Figure 6:
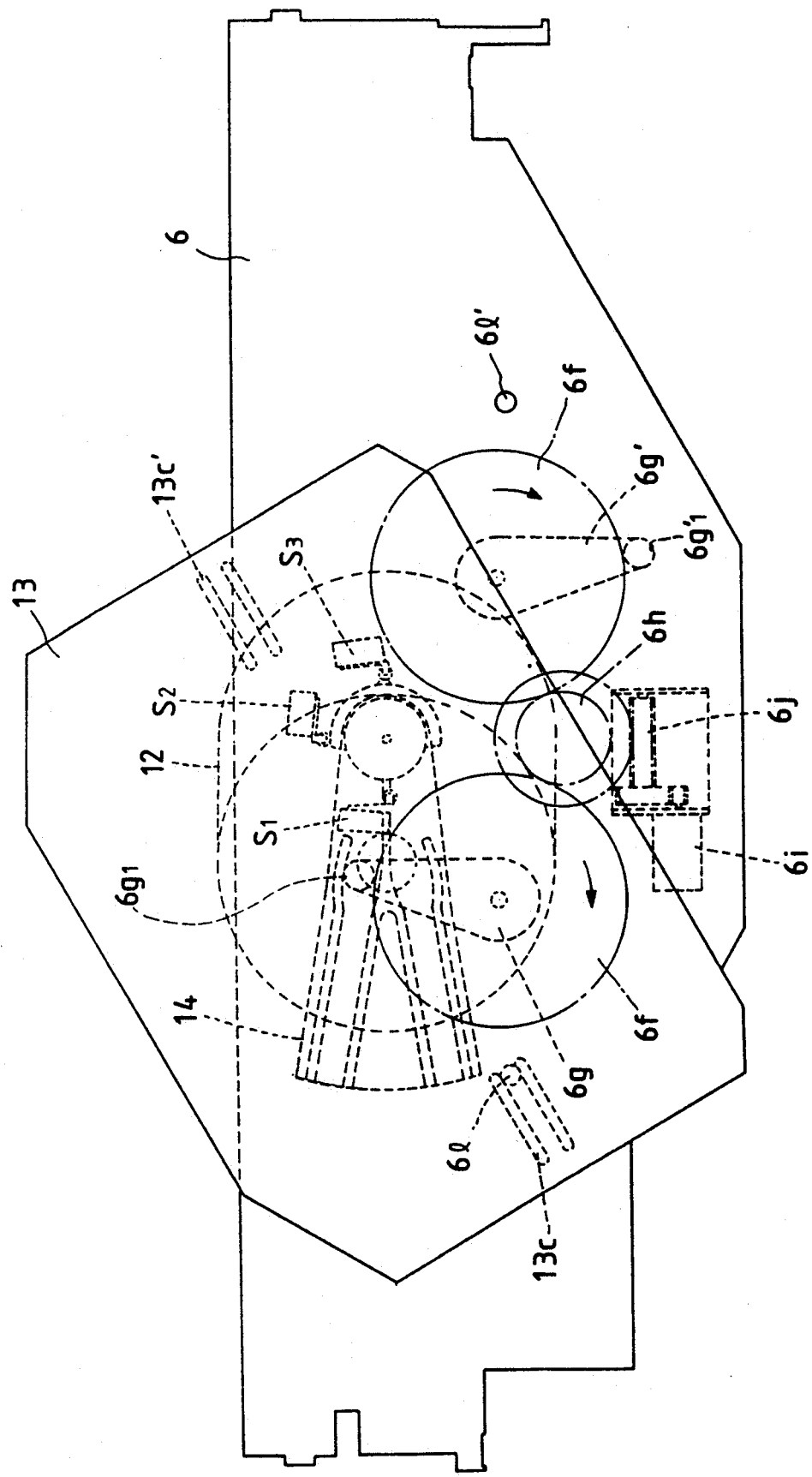
FIG. 6 is a plan view of the part of the means in a moved state.
Figure 7:
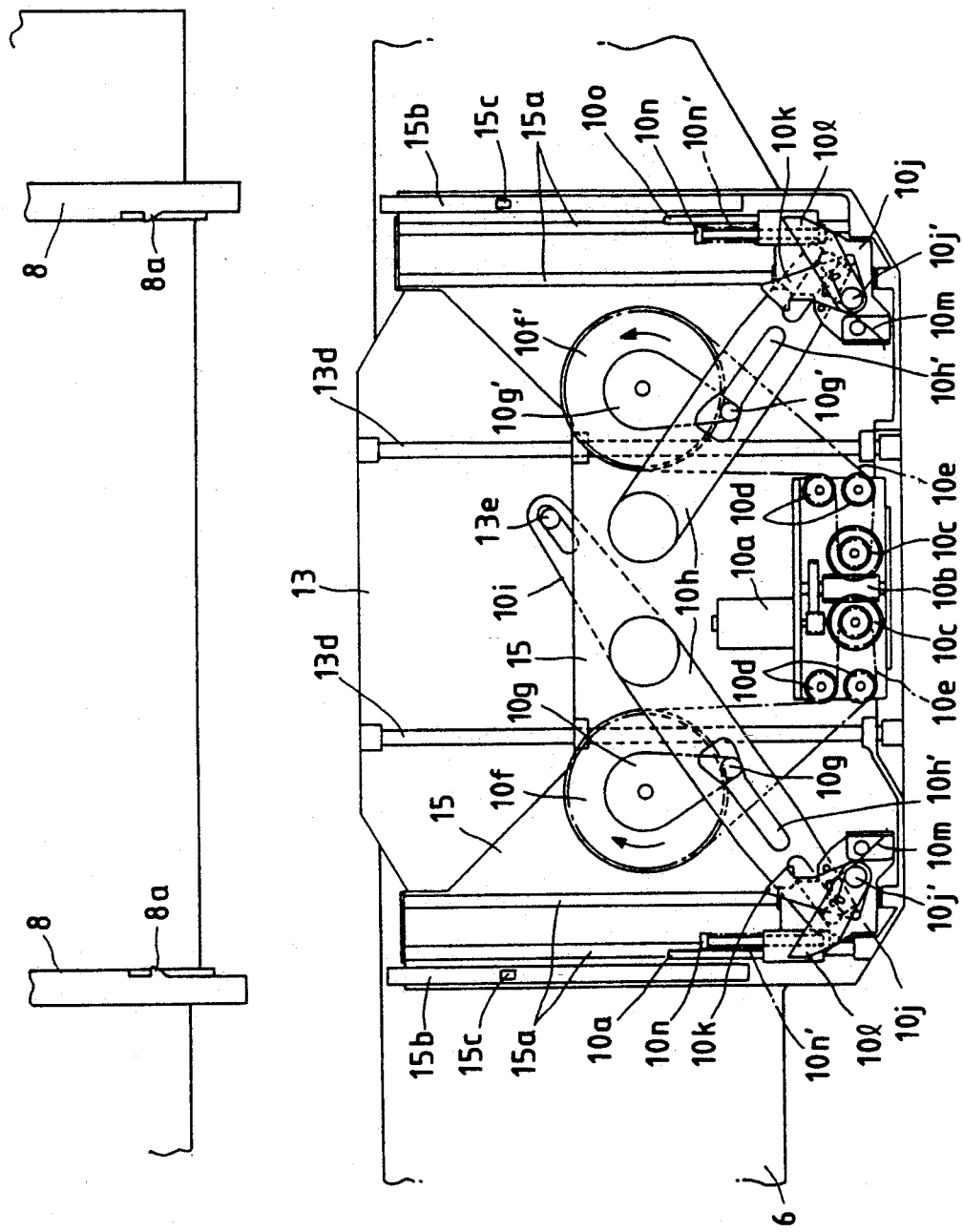
FIG. 7 is a plan view of another part of the means.
Figure 11:
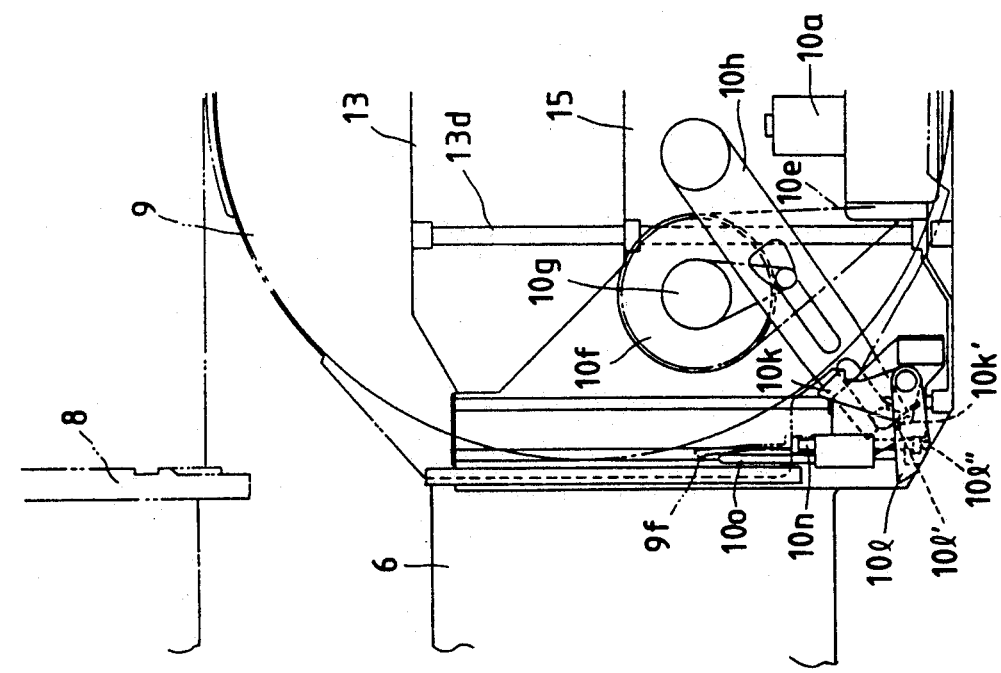
Figure 19:
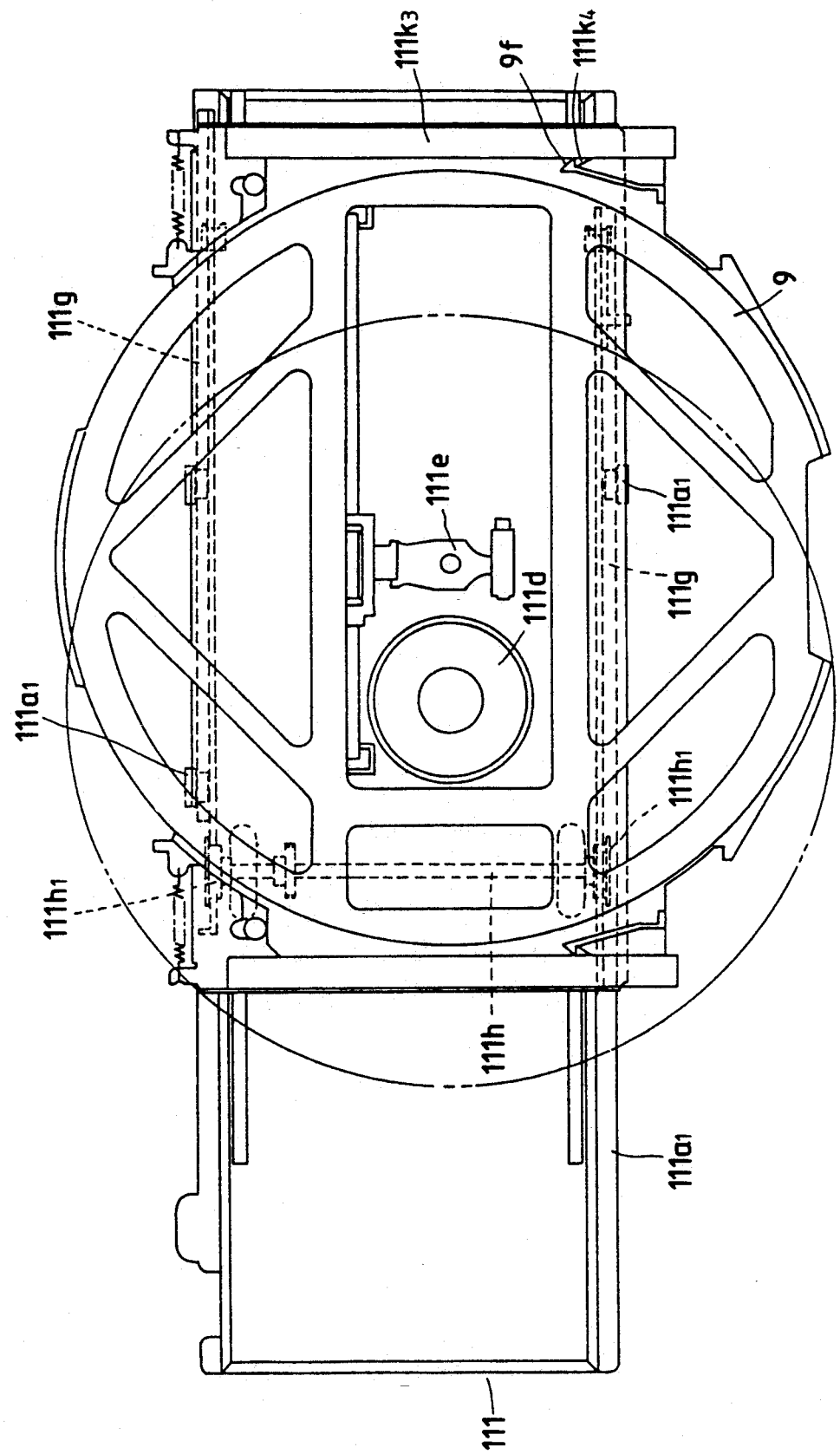
FIG. 19 is a plan view of the player unit fitted with the tray moving frame in a moved state.

While the forward movement of the moving plate 15 and the moving members 10j to the original positions thereof is completed, the switch not shown in the drawings acts to cease the rotation of the motor 10a and apply electric power to the motor 6i so that an operation reverse to that described above is performed to return the swing plate 13 to a neutral position shown in FIG. 5. When the switch $S_2$ is then turned on, the application of the electric power to the motor 6i is ceased so that the rotation of the motor is stopped. At that time, electric power is applied to the motor 10a again so that the moving plate 15 and the moving members 10j are moved backward. Because of the backward movement of the moving members 10j, the tray 9 is moved backward while being pulled out from the guide grooves 15b of the moving plate 15 and inserted into the guide grooves 111$k_3$ (FIG. 19) of the disk player 11 or 11' described hereinafter. Immediately before the end of the backward movement of the moving members 10j, the return arms 10l come into contact with the restrictors 15c as shown in FIG. 11. Since the restrictors 15c are not turnable backward, the return arms 10l are swung against the forces of the wound springs 10m so that the projections 10k' of the engage-arms 10k engaged with the projections 10l' of the return arms are pulled. As a result, the engagement arms 10k are also swung against the forces of the would springs 10m in the same directions as the return arms 10l so that the engagement arms are disengaged from the hooks 9g of the tray 9. After the disengagement, the tray 9 is pushed in to the ends of the guide grooves 111$k_3$ by the rods 10n urged by the springs 10n'. When the backward movement of the moving plate 15 and the moving members 10j to the ends of the strokes thereof is completed, the application of the electric power to the motor 10a is ceased so that the movement is stopped, in the same manner as that described above, in a state shown in FIGS. 11 and 13. After the stoppage of the movement, the motor 10a is rotated in reverse so that the moving plate 15 and the moving members 10j are moved forward. Since the disengaging pins 10o are put out of contact with the elastic engagement lugs 9f because of the forward movements of the moving members 10j, as shown in FIG. 19 the lugs are engaged with hooks 111$k_4$ provided at the guide groove 111$k_3$ of the disk player 11 or 11' and the rods 10n continue to push the tray 9 by the forces of the springs 10n'. As a result, the tray 9 is set in the disk player 11 or 11'.

After the disk D in the tray 9 is played by the disk player 11 or 11', the tray is returned to the tray transfer means 10 by an operation similar to that of taking out the tray from the tray guide 8 or 8'. The tray 9 returned to the tray transfer means 10 is moved back to the tray guide 8 or 8' by an operation reverse to that of transferring the tray to the disk player 11 or 11'.

Figure 14:
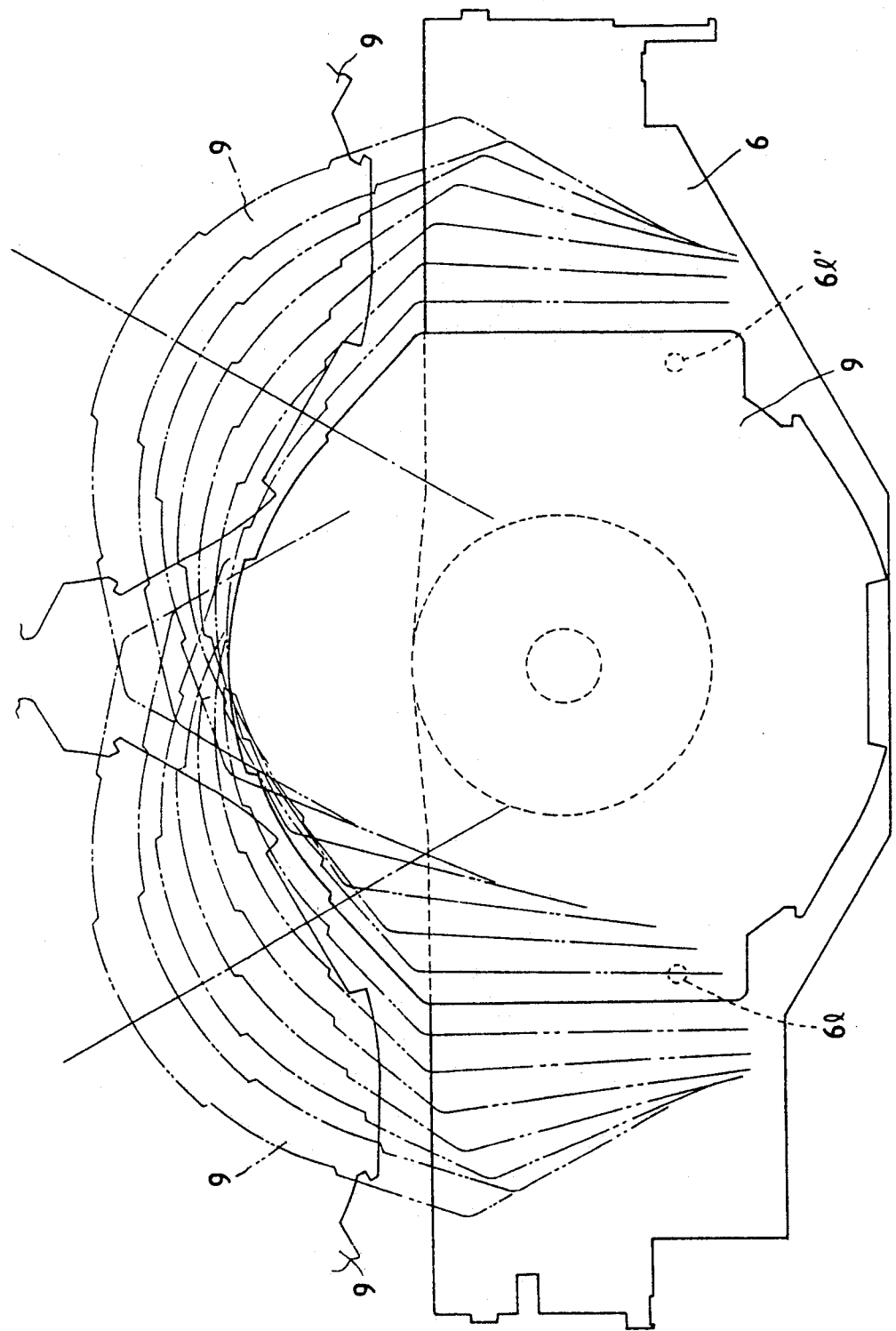
Figure 15:
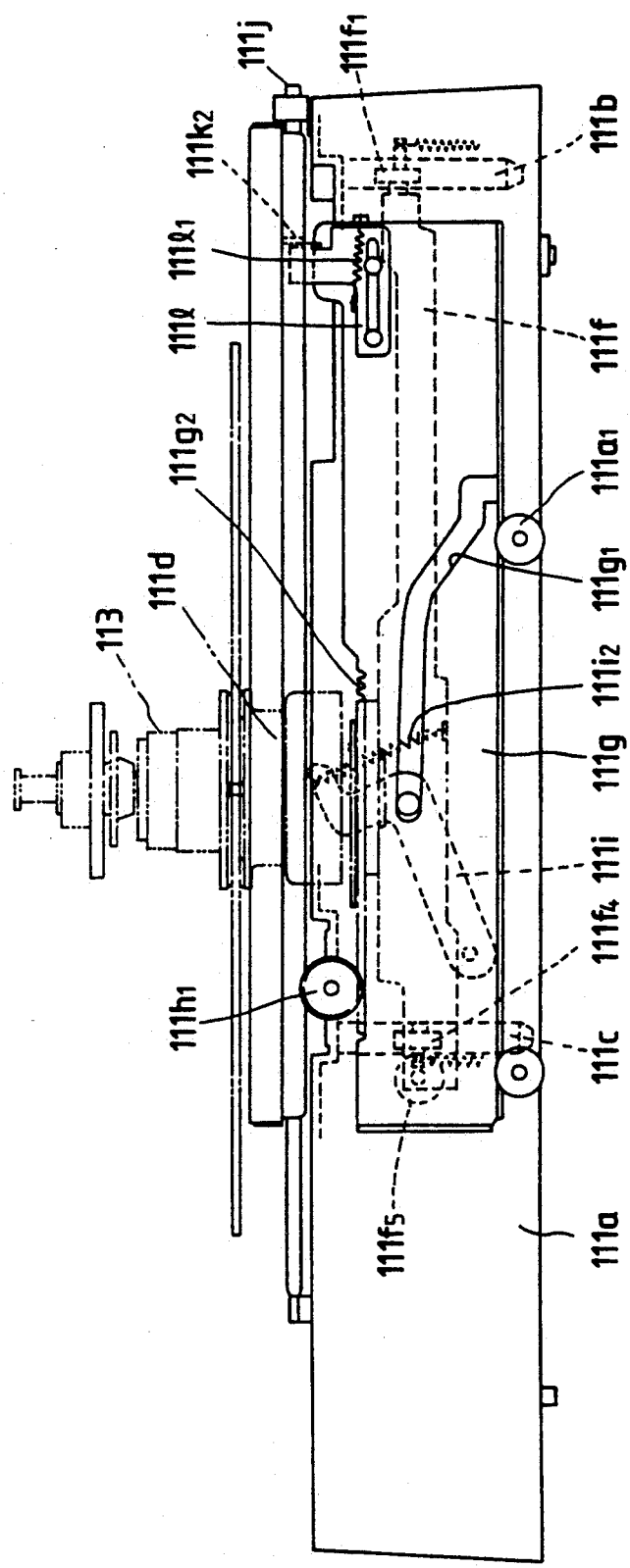
FIG. 15 is a front view of a lower disk player unit.

FIG. 14 is a plan view of the tray 9 being transferred.

Figure 16:
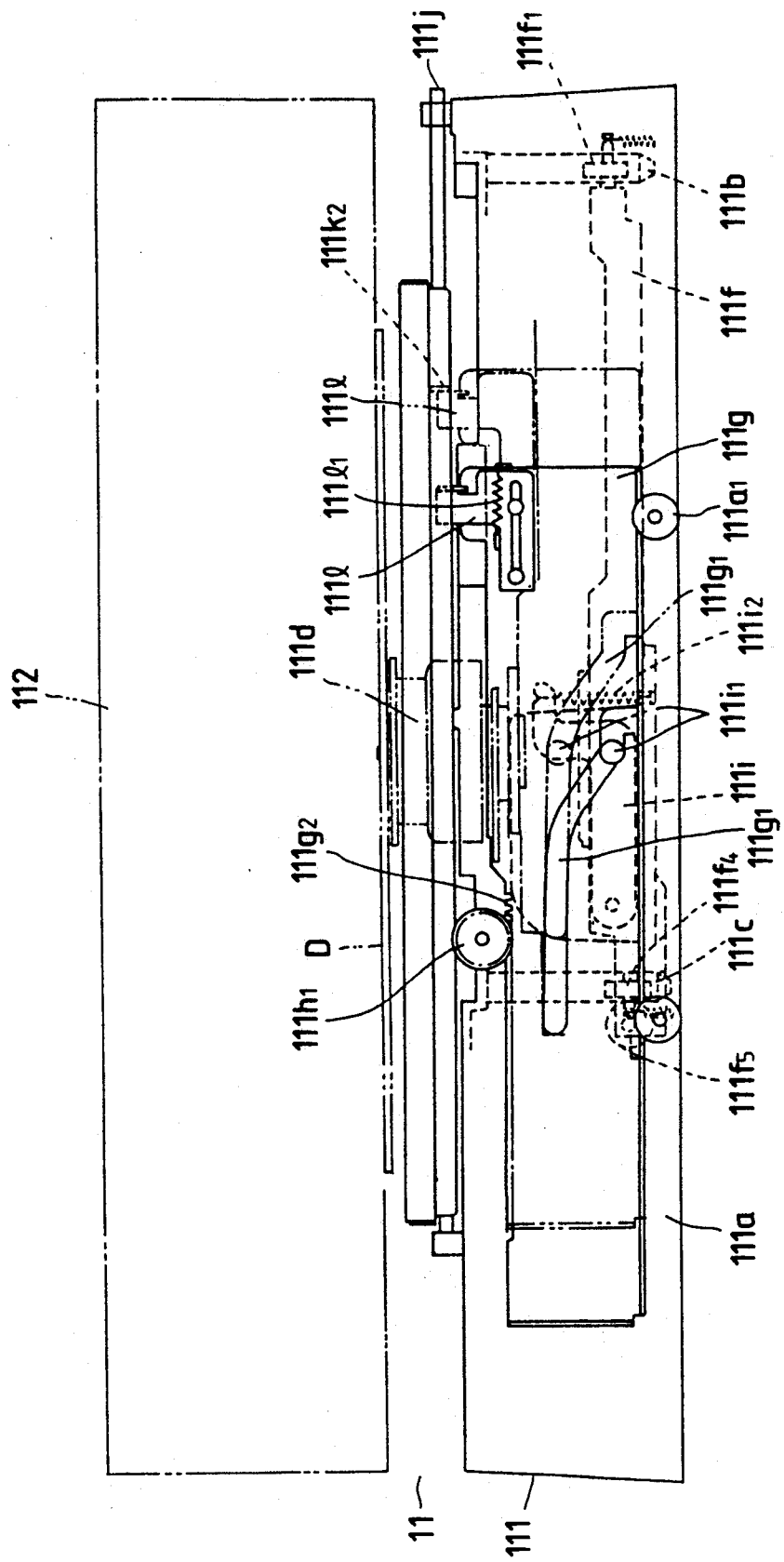
FIG. 16 is a front view of the player unit in a moved state.
Figure 17:
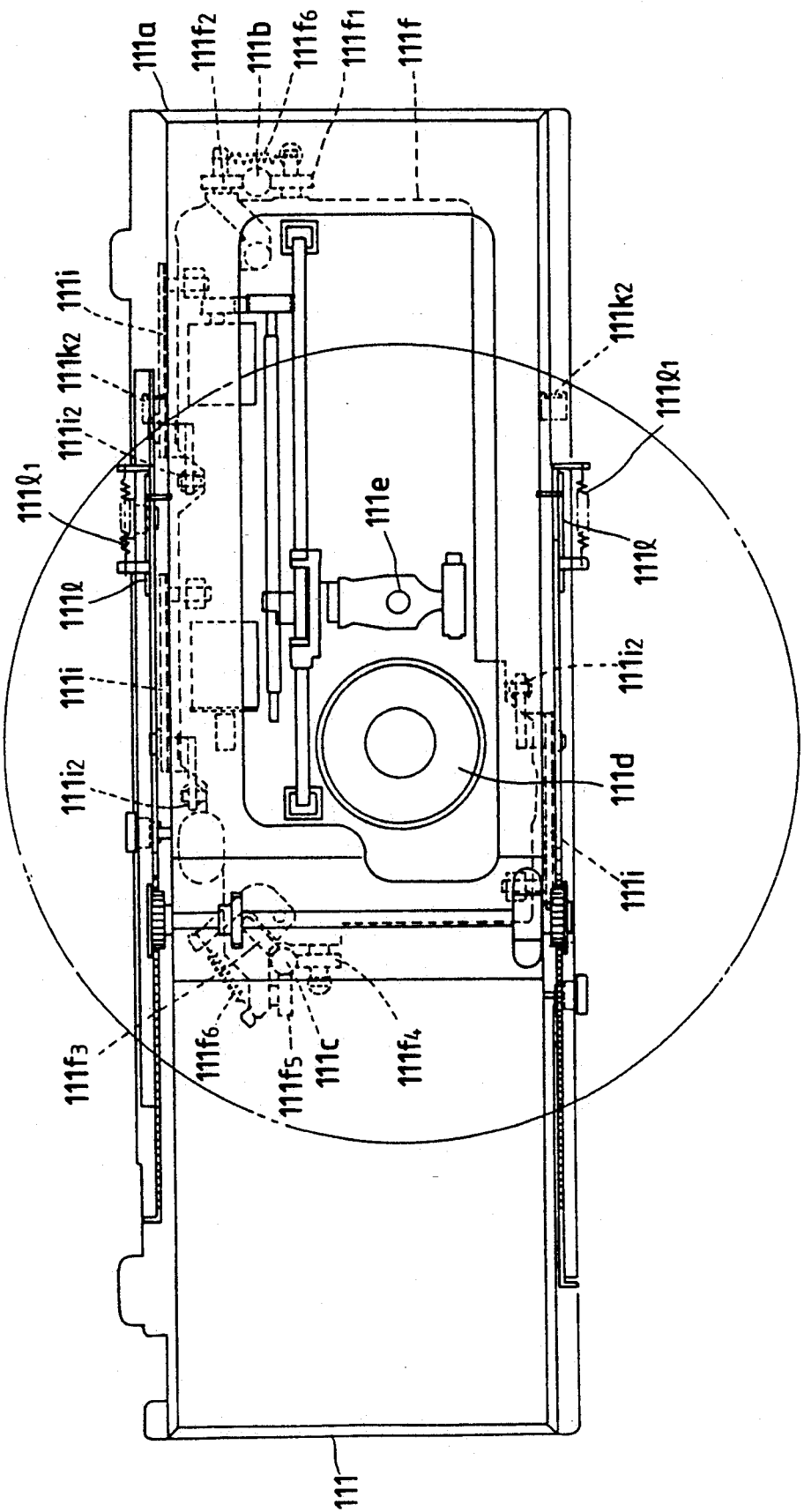
FIG. 17 is a plan view of the player unit.
Figure 18:
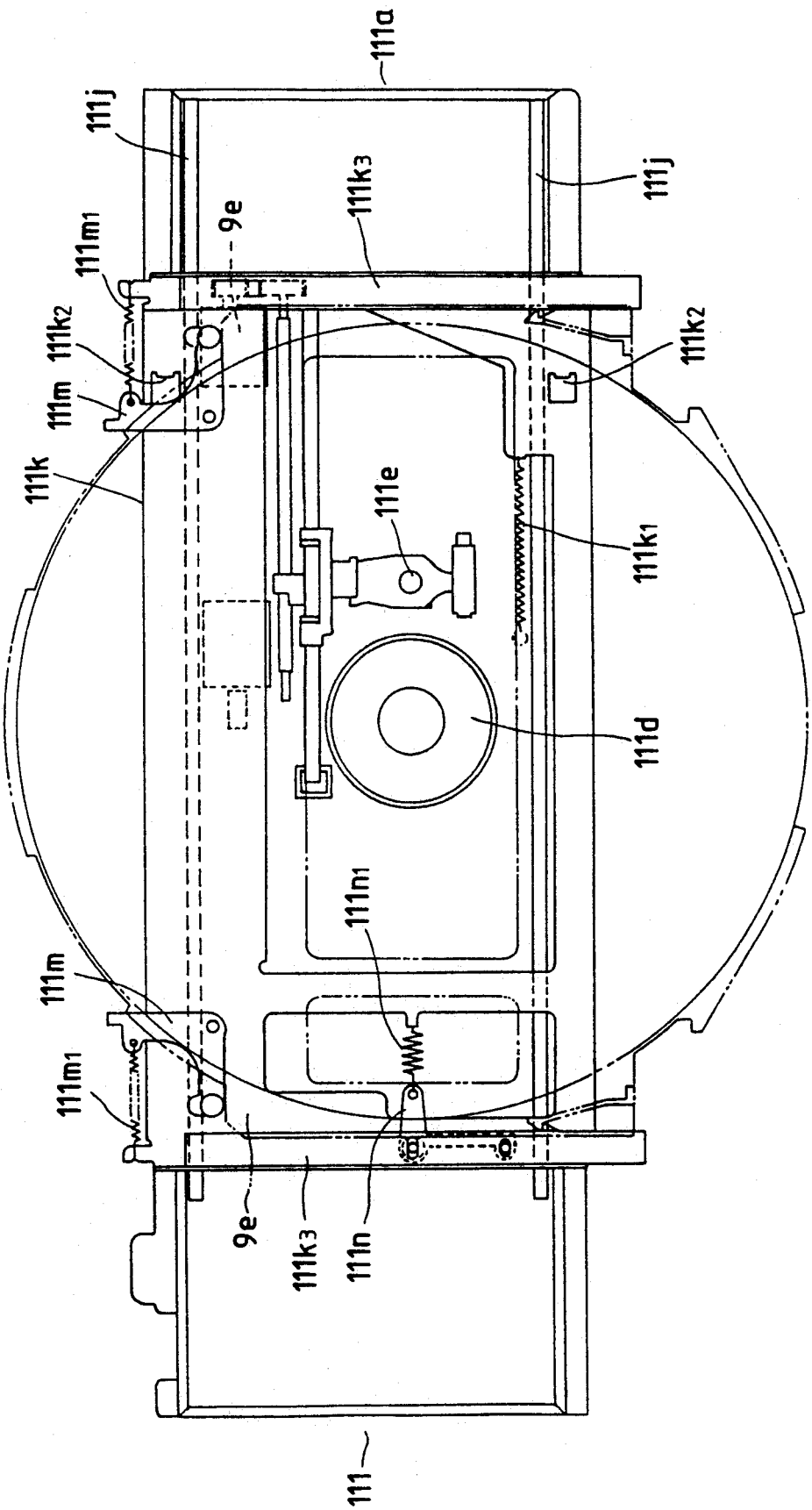
FIG. 18 is a plan view of the player unit fitted with a tray moving frame.

The constitution of the disk players 11 and 11' installed in the case 1 at the upper and lower portions thereof is described with reference to FIGS. 15, 16, 17, 18, 19, 20, 21, 22, 23, 24, 25 and 26 from now on. Since the disk players 11 and 11' are the same as each other in constitution, the constitution of only the upper disk player 11 is described herein. The disk player 11 includes pickups 111e which are located over and under the disk D to read recorded information from both the sides of the disk while the disk is supported by a turntable unit and a clamper. The disk player 11 is composed of an upper and a lower disk player units 112 and 111 disposed at a prescribed distance from each other as shown in FIG. 16.

The constitution of the lower disk player unit 111 is first described in detail with reference to FIGS. 15, 16, 17, 18 and 19. The lower disk player unit 111 includes a box 111a, support shafts 111b and 111c, the conventional turntable unit 111d, the pickup 111e, a pickup base 111f, sliding plates 111g, a rotary shaft 111h, swing arms 111i, guide bars 111j, a tray moving frame 111k, moving plates 111l, a pair of L-shaped push-out swing plates 111m, and an L-shaped push plate 111n. The box 111a is secured to the case 1. The support shafts 111b and 111c extend from the box 111a. The pickup base 111f is fitted with the pickup 111e, which is horizontally moved to read recorded information from the disk D pinch-held by the turntable unit 111d and the clamper described hereinafter. The pickup base 111f is also fitted with a fixed roller $111f_1$ and a displaceable roller $111f_2$ at one end of the base. The fixed roller $111f_1$ is disposed in contact with the support shaft 111b. The displaceable roller $111f_2$ is disposed in elastic contact with the support shaft 111b by a spring $111f_6$. The pickup base 111f is furthermore fitted with two fixed rollers $111f_4$ and $111f_5$ and a displaceable roller $111f_3$ at the other end of the base. The fixed rollers $111f_4$ and $111f_5$ are disposed in contact with the support shaft 111c. The displaceable roller $111f_3$ is disposed in elastic contact with the support shaft 111c by a spring $111f_6$. As a result, the pickup base 111f is supported by the rollers $111f_1$, $111f_2$, $111f_3$, $111f_4$ and $111f_5$ so that the base can be only moved up and down. The sliding plates 111g are slidably supported by rollers $111a_1$ provided at the front and rear of the box 111a. The sliding plate 111g at the front of the box 111a has a guide hole $111g_1$ curved with an obtuse angle. The other sliding plate 111g at the rear of the box 111a has two guide holes each curved with an obtuse angle but not shown in the drawings. The sliding plates 111g are formed with racks $111g_2$ at portions of the upper edges of the plates. The racks $111g_2$ are engaged with gears $111h_1$ secured to both the ends of the rotary shaft 111h, which is rotated by a motor not shown in the drawings. When the motor is driven so that the gears $111h_1$ are rotated, the sliding plates 111g are moved leftward with regard to FIG. 16. The pickup base 111f is fitted with the swing arms 111i each supported at one end thereof. Pins $111i_1$ project from the nearly central portions of the swing arms 111i and are inserted into the guide holes $111g_1$ of the sliding plates 111g. A spring $111i_2$ is anchored in a tensile manner to the tip of each of the swing arms 111i and the pickup base 111f. When the sliding plates 111g are moved rightward with regard to FIG. 6 as mentioned above, the swing arms 111i are moved upward as in FIG. 15 so that the pickup base 111f is lifted by the forces of the springs $111i_2$. As a result, the turntable unit 111d moves up the disk D in the tray 9. The guide bars 111j are disposed at the front and rear upper edges of the box 111a so as to guide the tray moving frame 111k when it is moved. A spring $111k_1$ is anchored in a tensile manner to the tray moving frame 111k and the box 111a and always urges the frame leftward with regard to FIGS. 18 and 19. Vertical lugs $111k_2$ extend down from the bottoms of the front and rear of the tray moving frame 111k and are in contact with the moving plates 111l which are coupled to the sliding plates 111g so that the moving plates are horizontally movable. A spring $111l_1$ is anchored in a tensile manner to each sliding plate 111g and the corresponding moving plate 111l and always urges the moving plate rightward with regard to FIG. 17. While the sliding plates 111g are moved from positions shown by full lines in FIG. 16 to other positions shown by dotted lines therein, the pickup base 111f is lifted so that the turntable unit 111d moves up the disk D in the tray 9. When the sliding plates 111g have reached the positions shown by the dotted lines in FIG. 16, the tips of the moving plates 111l come into contact with the vertical lugs $111k_2$ of the tray moving frame 111k. When the sliding plates 111g are then moved to positions shown in FIG. 15, the tray moving frame 111k is moved against the force of the spring $111k_1$ so that the frame is stopped at the end of the box 111a as shown in FIG. 19. The excess movement of each sliding plate 111g is absorbed by the spring $111k_1$. As a result, the peripheral edge of the tray 9 is not located in the range of the movement of the pickup 111e. For that reason, the tray can be nearly equalized to the disk D in size. Tray guides $111k_3$ similar to the tray guides 8 and 8' attached to the body of the case 1 are secured to the right and left sides of the tray moving frame 111k so that the tray 9 brought by the tray transfer means 10 is inserted into the tray guides $111k_3$. The tray guides $111k_3$ are formed with projections $111k_4$, which are engaged with the elastic engagement lugs 9f of the tray 9. The pair of L-shaped push-out swing plates 111m are attached to the tray moving frame 111k at the rear thereof near both the sides thereof so that the plates are swingable. A spring $111m_1$ is anchored in a tensile manner to the tray moving frame 111k and one end of each push-out swing plate 111m whose other end is in contact with the tip of the projection 9e of the tray 9. The swing plate 111m is always urged by the spring $111m_1$ in such a direction as to put out the tray 9. The L-shaped push plate 111n is attached to the tray moving frame 111k. One end of the plate 111n is inserted in the tray guide $111k_3$. A spring $111n_1$ is anchored in a tensile manner to the other end of the push plate $111_n$ and the tray moving frame 111k so that the side of the projection 9e of the tray 9 inserted in the tray guides $111k_3$ is pushed by the push plate to prevent the tray from moving either rightward or leftward due to a clearance. For that reason, in the state that the tray 9 is inserted in the guide rails $111k_3$ and the elastic engagement lugs 9f of the tray are engaged with the projections $111k_4$, the push plate 111n pushes the side of the projection 9e of the tray to prevent it from moving either rightward or leftward due to the clearance. When the elastic engagement lugs 9f and the projections $111k_4$ are disengaged from each other. The push-out swing plates 111m push out the tray 9. When the lugs 9f and the projections $111k_4$ remain engaged with each other, the push-out swing plates 111m prevent the tray 9 from moving either forward or backward due to a clearance.

Figure 20:
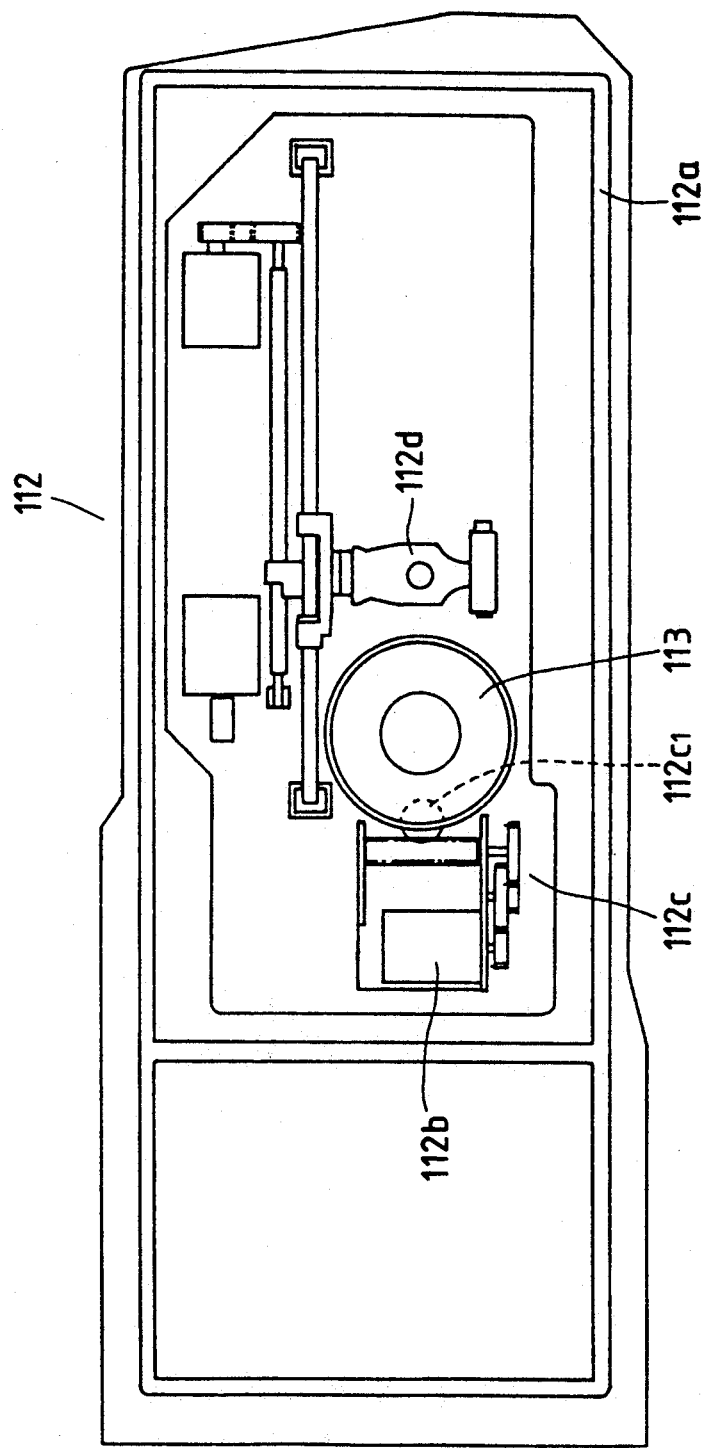
FIG. 20 is a bottom view of an upper disk player unit.
Figure 21:
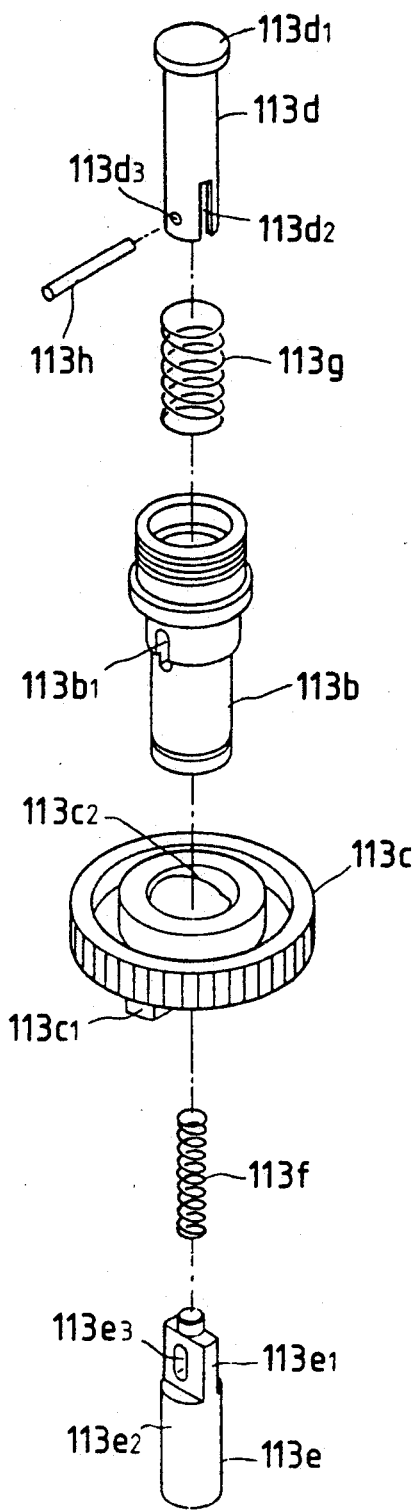
FIG. 21 is a perspective exploded view of a part of a clamper at the upper disk player unit.

The constitution of the upper disk player unit 112 is now described with reference to FIG. 20. The upper disk player unit 112 includes a box 112a, a motor 112b, a speed reduction gear train 112c, the pickup 112d supported to be horizontally movable, and the clamper 13 supported in the box 12a so that the clamper can be moved up and down by the motor 112b and the speed reduction gear train 112c. The pickup 112d functions to read recorded information from the disk D pinched by the clamper 113 and the turntable unit 111d of the lower disk player unit 111. If the disk D is a video disk consisting of two circular plates conjoined to each other, the center hole of the lower circular plate is likely to be non-coincident with that of the upper circular plate so that the turntable unit $111d$ is eccentric to the center hole of the upper circular plate of the disk centered by the turntable unit and pinched by the clamper 13 and the turntable unit. In the case of the eccentricity, the disk D rotates eccentrically to the upper pickup $112d$ to make it difficult to properly track the disk. In order to avoid such difficulty, the disk D, from the upper circular plate of which recorded information is to be read by the pickup $112d$, is centered by the clamper 113 and then pinched between the turntable unit $111d$ and the clamper.

The clamper 113 is described in detail with reference to FIGS. 21, 22, 23, 24, 25 and 26. The clamper 113 includes a base $113a$, a pipe $113b$, a gear $113c$, a hollow shaft $113d$, a rod $113e$, springs $113f$ and $113g$, a pin $113h$, a support plate $113i$, a spring $113j$, a disk push plate $113k$, a mounting plate $113l$, and a position restricting plate $113m$ for positioning the disk D. The base $113a$ is secured to the box $112a$ by an appropriate means. The pipe $113b$ is secured in the central portion of the base $113a$. The final gear $112c_1$ of the speed reduction gear train $112c$ is supported by the base $113a$. The base $113a$ is fitted with a switch $113a_1$, with which operating pins $113c_1$ provided at an angular interval of 180 degrees on the bottom of the peripheral portion of the gear $113c$ supported by the pipe $113b$ under the base $113a$ and engaged with the final gear $112c_1$ are alternately put into contact. The gear $113c$ has a cam portion $113c_2$ inside the operating pins $113c_1$. The hollow shaft $113d$ is formed with a spring engaging flange $113d_1$ at the upper end of the shaft, and has notches $113d_2$ extending at the lower end of the shaft and facing each other, and pin fitting holes $113d_3$ facing each other and located at the lower end of the shaft at angular intervals of 90 degrees from the notches. The rod $1113e$ has an upper flat portion $113e_1$ inserted in the notches $113d_2$ of the hollow shaft $113d$, a lower round portion $113e_2$, and a slender hole $113e_3$ provided in the upper flat portion. The spring $113f$ is housed in the hollow shaft $113d$. The hollow shaft $113d$ and the spring $113g$ are inserted down into the pipe $113b$. The rod $113e$ is inserted up into the pipe $113b$ so that the upper flat portion of the rod is fitted in the notches $113d_2$ of the pipe. The pin $113h$ is then inserted into one of slender holes $113b_1$ provided in the pipe $113b$ and facing each other, so that the pin extends through the hollow shaft $113d$, the slender hole $113e_3$ of the rod $113e$ and the other slender hole $113b_1$ and projects at both the ends of the pin from the pipe $113b$. As a result, the projecting ends of the pin $113h$ are in contact with the cam portion $113c_2$ of the gear $113c$, the hollow shaft $113d$ and the rod $113e$ are coupled to each other by the pin, and the spring $113f$ urges the rod in such a direction as to move the rod away from the shaft. The support plate $113i$ is borne so that it can be moved up and down relative to the pipe $113d$. The plate $113i$ is always urged downward by the spring $113j$. The disk push plate $113k$ is rotatably supported with a bearing $113i$ by the support plate $113i$. The mounting plate $113l$ is secured to the lower end of the rod $113e$ by a screw. The position restricting plate $113m$ is rotatably supported with a bearing $113l_1$ by the mounting plate $113l$. The peripheral portion $113m_1$ of the position restricting plate $113m$ is tapered to coincide with the center hole of the disk D. The central tubular portion $113m_2$ of the position restricting plate $113m$ projects down so that the center shaft $111d_1$ of the turntable unit $111d$ is inserted into the central tubular portion.

The body $111d_3$ of the turntable unit $111d$ is rotated by a motor $111d_2$ provided therein. A disk position restricting plate $111d_5$ is attached to the central portion of the body $111d_3$ and urged upward by a spring $111d_4$.

Figure 22:
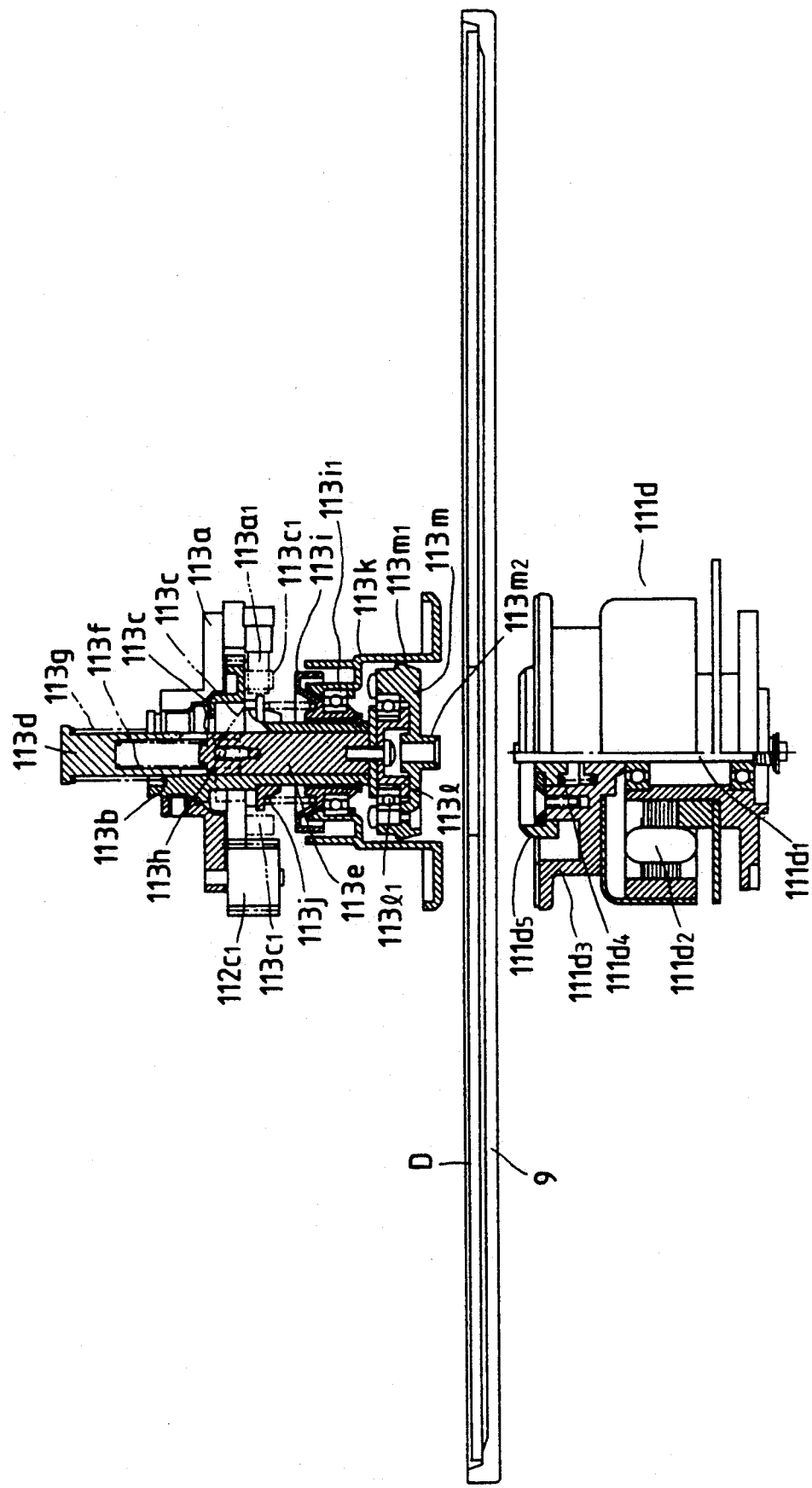
FIGS. 22, 23, 24, 25 and 26 are partial sectional views of a turntable unit and the clamper in states of pinching a disk.
Figure 23:
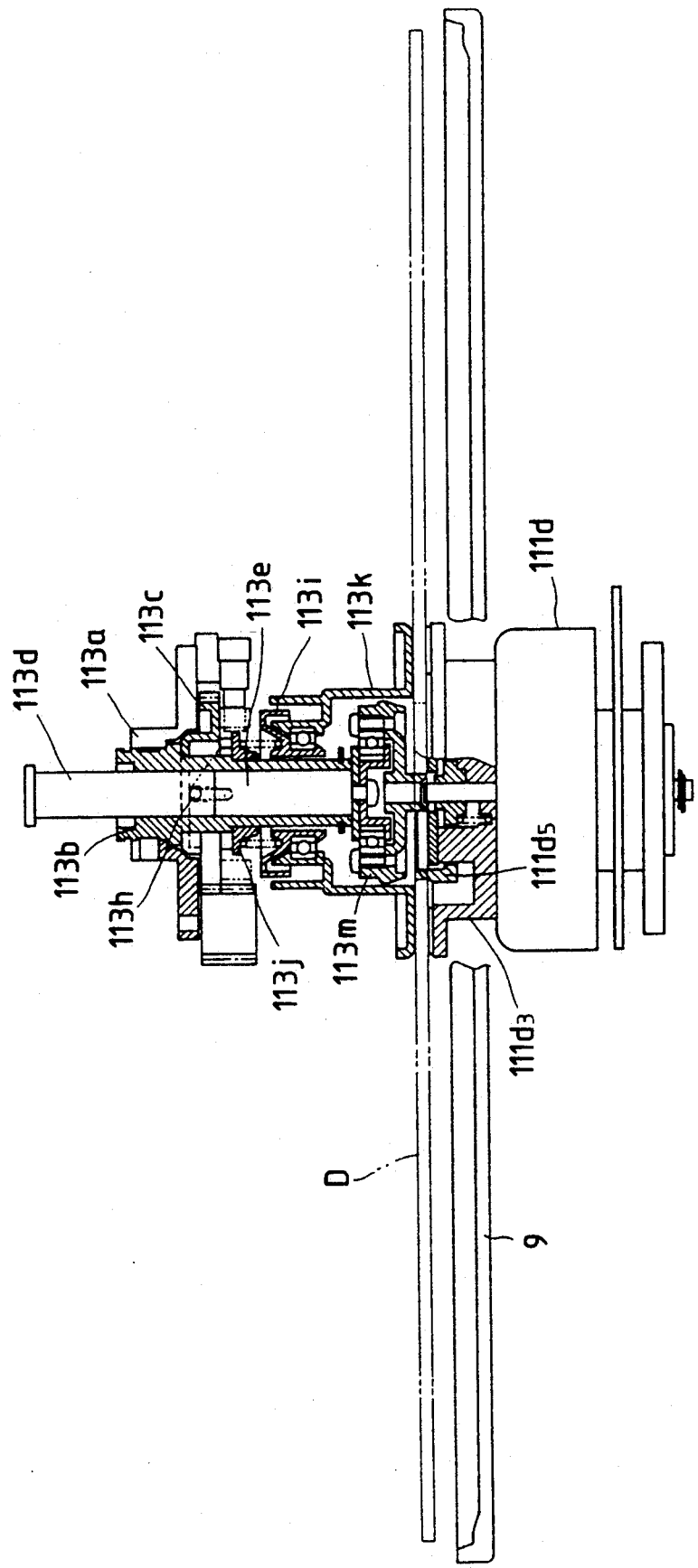
Figure 24:
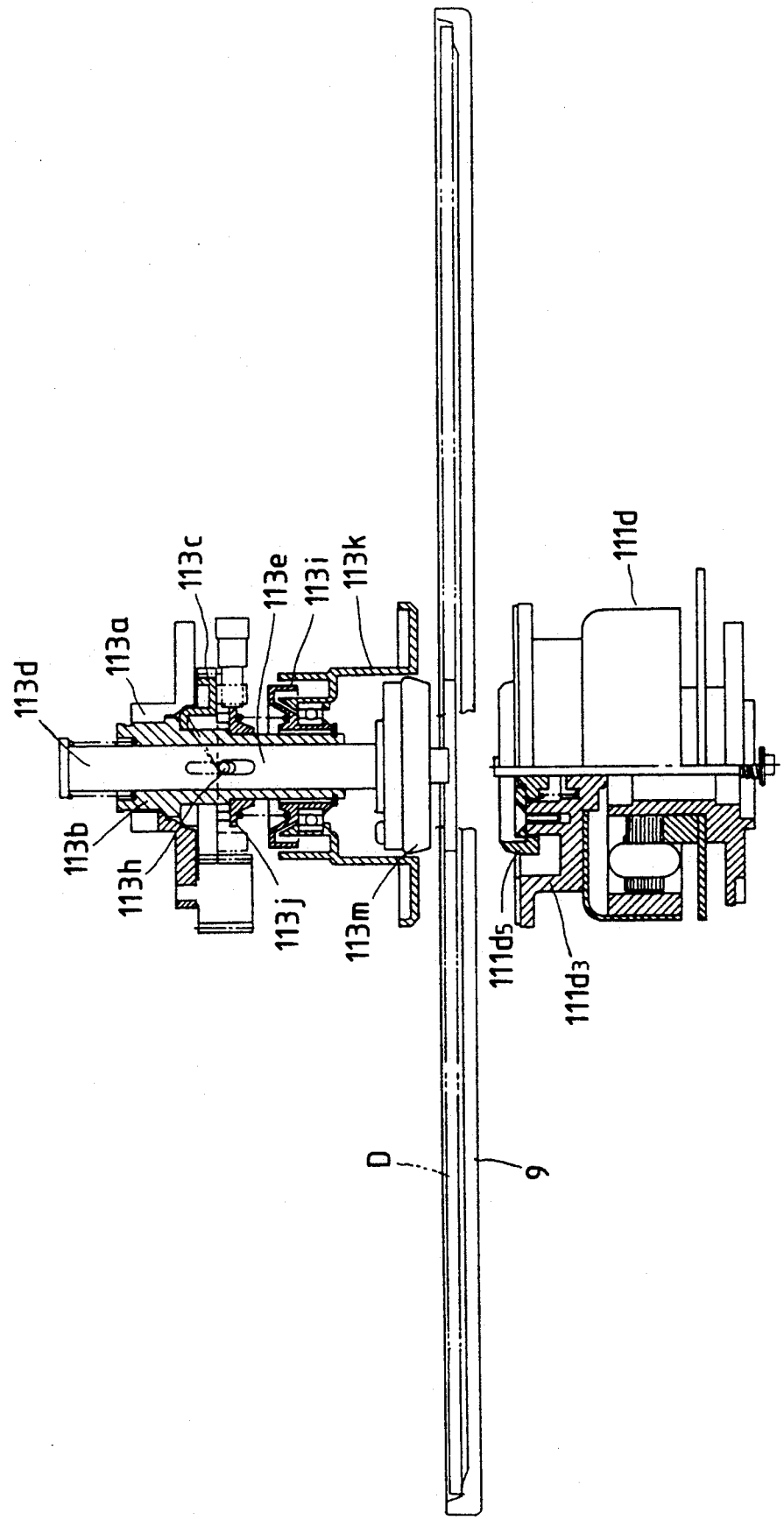
Figure 25:
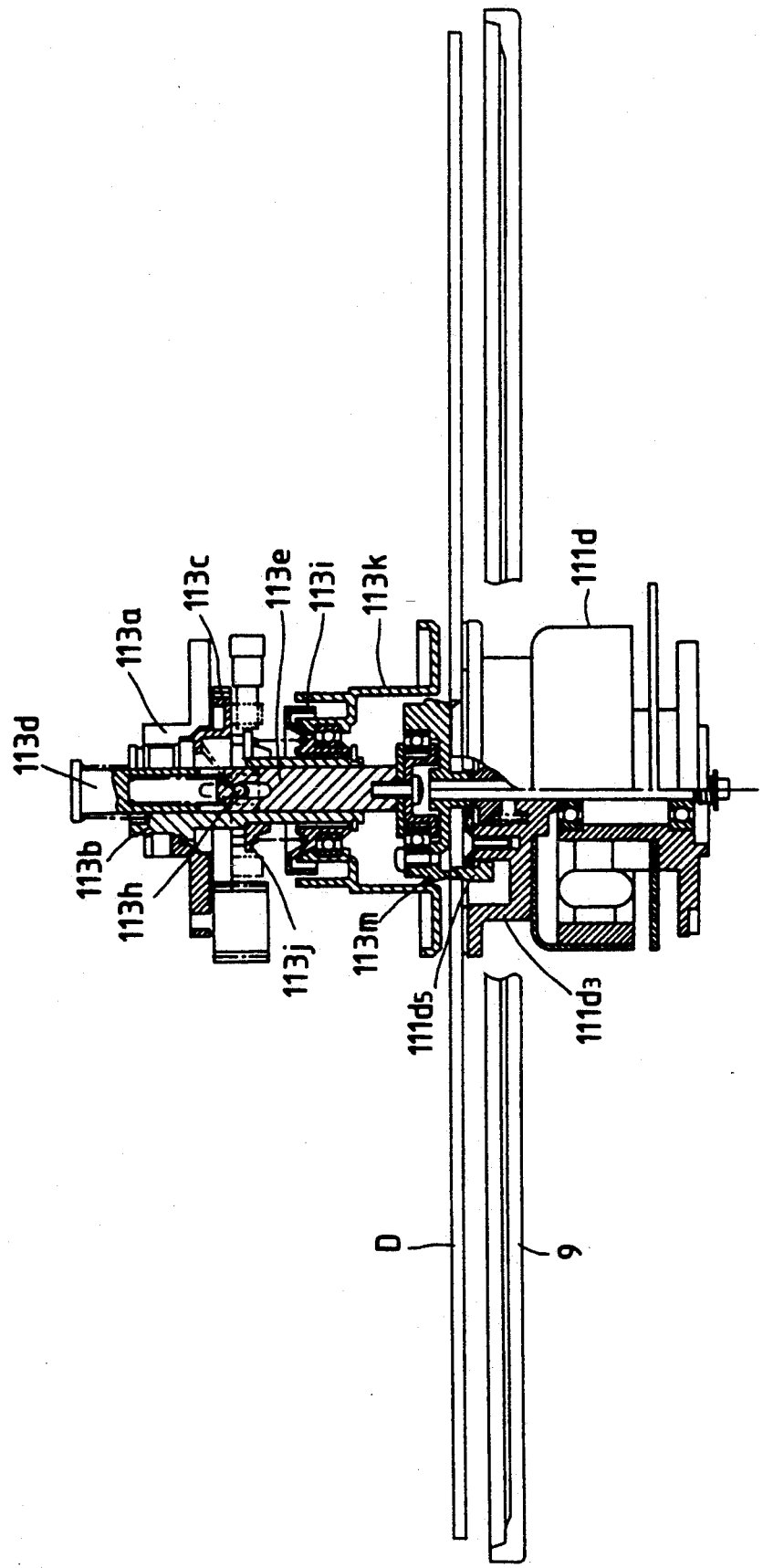
Figure 26:
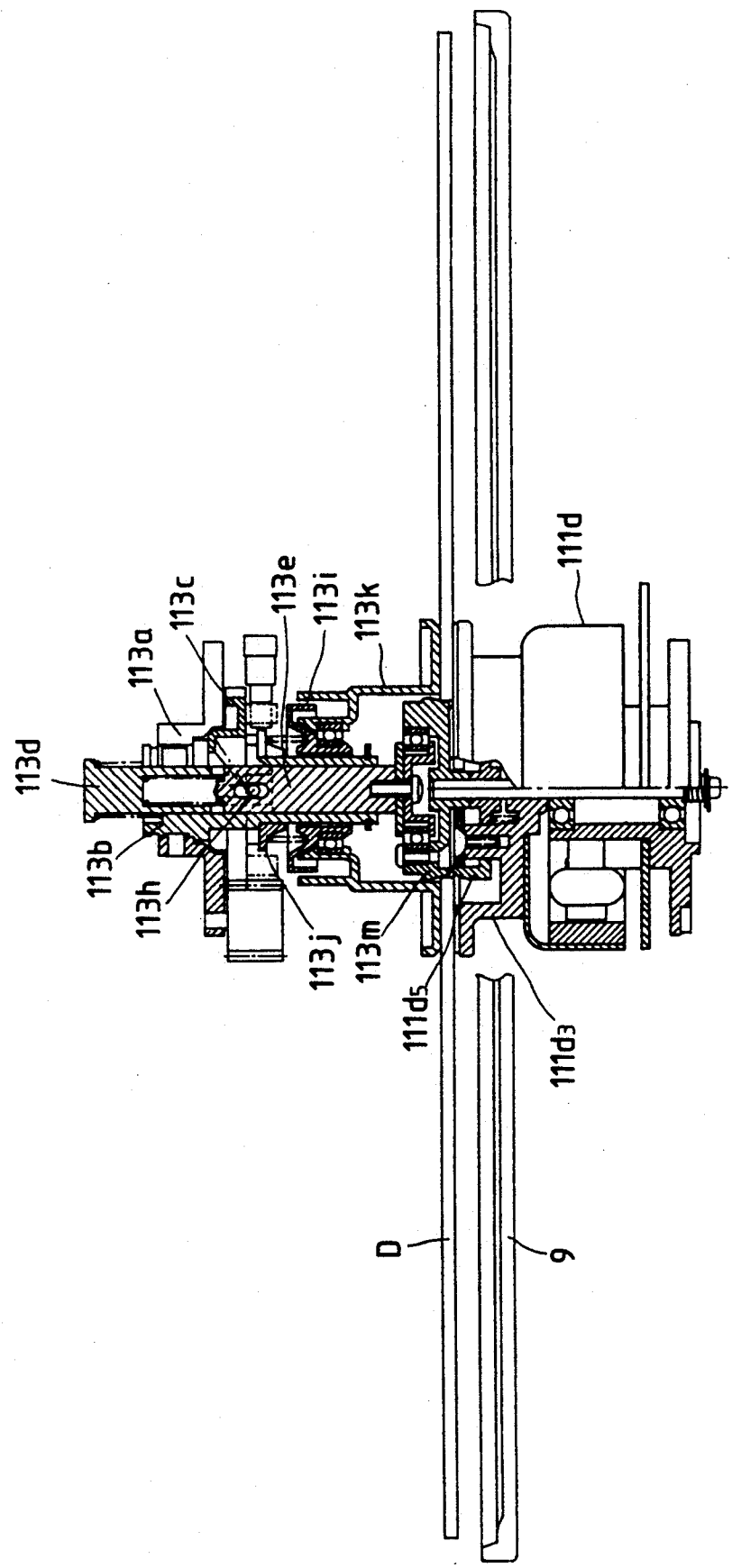

Pinching the disk D by the turntable unit $111d$ and the clamper 113 to play the disk is described from now on. When an instruction for playing the lower side of the disk D contained in the tray 9 as shown in FIG. 22 is applied as the tray is in the tray guides $111k_3$ of the tray moving frame $111k$, the sliding plates $111g$ are moved so that the pickup base $111f$ is lifted As a result, the turntable unit $111d$ is moved up. At that time, the position restricting plate $111d_5$ is inserted up into the center hole of the disk D so that the disk is positioned by the turntable unit $111d$. When the turntable unit $111d$ is moved up further, the body $111d_3$ thereof pushes up the disk D toward the disk push plate $113k$ of the clamper 113 so that the disk is pinched between the turntable unit body and the disk push plate as shown in FIG. 23. The motor $111d_2$ of the turntable unit $111d$ is then driven to rotate the disk D to read the recorded information therefrom as the pickup $111e$ is moved. When an instruction for playing the upper side of the disk D contained in the tray 9 (the disk pinched between the turntable unit $111d$ and the clamper 113 can be returned into the tray 9 by an operation reverse to that described above) is applied, the motor $112b$ is driven so that the final gear $112c_1$ of the speed reduction gear train $112c$ is rotated to turn the gear $113c$ of the clamper until the operating pin $113c_1$ of the gear $113c$ comes into contact with the switch $113a_1$. At that time, the pin $113h$ is moved down due to the action of the cam portion $113c_2$ of the gear $113c$ so that the hollow shaft $113d$ and the rod $113e$ are moved down against the force of the spring $113g$. As a result, the central tubular portion $113m_2$ of the position restricting plate $113m$ is inserted down into the center hole of the disk D as shown in FIG. 24. The sliding plates $111g$ are moved similarly to the above-described operation for the playing of the lower side of the disk D so that the turntable unit $111d$ is lifted. Since the position restricting plate $113m$ is already in a moved-down position at that time, the fixed center shaft $111d_1$ of the turntable unit $111d$ is inserted up into the central tubular portion $113m_2$ of the position restricting plate. Besides, the position restricting plate $111d_5$ is inserted into the center hole of the disk D, and the top of the body $111d_3$ of the turntable unit $111d$ comes into contact with the lower side of the disk, as shown in FIG. 25. When the turntable unit $111d$ is moved up further, the central portion of the position restricting plate $111d_5$ comes into contact with the lower end of the central tubular portion $113m_2$ of the position restricting plate $113m$ of the clamper 113 so that the position restricting plate $111d_5$ is stopped by the other position restricting plate $113m$. The body $111d_3$ of the turntable unit $111d$ is then lifted further so that the disk D is moved up by the body $111d_3$ of the unit. As a result, the disk D is separated from the position restricting plate $111d_5$ at the center hole of the disk and then fitted on the peripheral potion $113m_1$ of the position restricting plate $113m$ at the center hole of the disk so that the disk is positioned by the plate $113m$. When the lifting of the turntable unit $111d$ is completed, the body $111d_3$ of the turntable unit pushes the disk D to the disk push plate $113k$ of the clamper 113 to pinch the disk between them as shown in FIG. 26. The motor $111d_2$ of the turntable unit $111d$ is then driven so that the disk D is rotated to be played.

The operation of the automatic disk changer as a whole is described from now on. When a desired program such as accompaniment music is chosen by a manipulating section not shown in the drawings, a control section not shown in the drawings judges which disk D the desired program is recorded in. The moving rest 6 is then moved depending on the result of the judgement so that the guide grooves 15b are made coincident with the tray guide 8 or 8' holding the disk D having the program. The motor 6i is then driven so that the swing plate 13 is swung rightward or leftward. Then the motor 10a is operated and the tray guide 15 is moved backward, the projections 8a of the tray guide 8 or 8' and the elastic engagement lugs 9f of the tray i are disengaged from each other by the disengaging pins 10o, and the engagement arms 10k and the hooks 9g of the tray 9 are engaged with each other. After that, the motor 10a is rotated in reverse so that the tray 9 is pulled out from the tray guide 8 or 8' into the guide grooves 15b. The motor 6i is then rotated in reverse so that the swing plate 13 is swung back to the neutral position. The moving rest 6 is thereafter moved to the upper or lower disk player 11 or 11' so that the guide grooves 15b of the tray transfer means 10 are made coincident with the tray guides 111k₃ of the lower disk player unit 111 of the upper or lower disk player 11 or 11'. At that time, if the upper disk player 11 is in playback, the moving rest 6 is moved to the lower disk player 11'. If the lower disk player 11' is in playback, the moving rest 6 is moved to the upper disk player 11. The motor 10a is then driven to move the moving plate 15 backward to transfer the tray 9 out of the guide grooves 15b to the tray guides 111k₃ so that the elastic engagement lugs 9f of the tray are engaged with the projections 111k₄ and the tray is held in the tray guides 111k₃ by the presence of the push plate 111n. The motor not shown in the drawings is then driven to move the sliding plates 111g to lift the turntable unit 111d to move up the disk D from the tray 9, pinch the disk between the turntable unit and the clamper 113 and position the disk by the turntable unit. After the positioning of the disk D is completed, the tray moving frame 111k is moved rightward by the movement of the sliding plates 111g. As a result, the tray 9 is put out of the range of the movement of the pickup 111e so that recorded information can be read from the lower side of the disk by the pickup as it is moved along the disk. If recorded information is to be read from the upper side of the disk D, the motor 112b is first driven so that the position restricting plate 113m is moved down. The sliding plates 111g are thereafter moved so that the disk is pinched between the turntable unit 111d and the clamper 113 and positioned by the clamper. The pickup 112d is then moved to read the recorded information from the upper side of the disk D. After the reading of the recorded information from the disk D is completed, the disk is put back into the tray 9 and returned into the tray guide 8 or 8' by an operation reverse to that described above.

According to the present invention, pairs of right and left tray guides for housing trays are provided in an automatic disk changer so that the center line of each right tray guide and that of the left tray guide corresponding thereto extend toward a tray transfer means and meet each other in the form of B and the center of swinging of the means is located inside the point of the meeting of the center lines. The tray transfer means is thus disposed near the tray guides so that the depth of the case of the changer is reduced. Therefore, the size of the changer is decreased.

According to the present invention, tray guides for housing trays in a case are provided in the case at the right and left portions thereof so that the center lines of the tray guides extend toward a tray transfer means. For that reason, the disks twice more in number that whose which can be housed in a conventional case can be housed in the former case of the same width and height as the conventional one, and each of the disks can be set on a disk player by the disk transfer means at the same speed as a conventional automatic disk changer.

Also according to the present invention, two disk players are installed in a case so that a disk can be prepared for playback by one of the disk players while another disk is being played by the other of the disk players. For that reason, the time from the end of the playback of one of the disks to the start of that of another of them is shortened. Besides, since tray guides for housing trays containing the disks are provided so that the center lines of the guides extend toward a tray transfer means, the disks twice more in number can be housed in the case of the same width and height as a conventional case than in the latter.

According to the present invention, a tray transfer means is guided by guide rails provided on the inside surface of the case of an automatic disk changer, so that the tray transfer means is moved up and down by timing belts and that the means is kept horizontal even if the rails are inclined. The tray transfer means is thus moved up and down in a horizontal posture even if a place where the automatic disk changer is installed is unhorizontal so that the case is disposed in an inclined posture. For that reason, a tray can be securely pulled out from a tray guide and inserted into a disk player by the tray transfer means. Therefore, the operation of the automatic disk changer is made surer.

We claim:

1. An automatic disk changer comprising a tray transfer means for selectively extracting and returning trays supporting disks and which are housed in a case, said tray transfer means being provided in said case at a central portion of a width thereof and guided by guide means so that said tray transfer means can be moved up and down; a disk player installed to play a disk optionally transferred by said tray transfer means; said case having right and left corner portions formed by intersecting structural walls, and pairs of right and left tray guides for housing trays in said case, said pair of right tray guides and said pair of left tray guides each defining a center line therebetween and being provided in said case at said right and left corner portions thereof so that the center lines of said tray guides extend generally from the respective right and left corner portions toward said tray transfer means and intersect each other to form a V shaped angle therebetween; wherein said tray transfer means comprises a single tray gripping means which is operative to move between three positions including a first tray gripping position corresponding to said pair of right tray guides, a second tray gripping position corresponding to said pair of left tray guides, and a neutral position.

2. An automatic disk changer comprising a tray transfer means for selectively extracting and returning trays housed in a case, said tray transfer means being provided in said case at a central portion of a width thereof and guided by guide means so that said tray transfer means can be moved up and down; two disk players, each of said disk players including means for removing and playing disks in trays optionally transferred by said tray transfer means; said case having right and left corner portions formed by intersecting structural walls, pairs of right and left tray guides, said pair of right tray guides and said pair of left tray guides each defining a center line therebetween and being provided on a large number of levels in said case at said right and left corner portions thereof so that the center lines of said tray guides extend generally from the respective right and left corner portions toward said tray transfer means and intersect each other to form a V shaped angle therebetween; wherein said tray transfer means comprises a single tray gripping means which is operative to move between three positions including a first tray gripping position corresponding to said pair of right tray guides, a second tray gripping position corresponding to said pair of left tray guides, and a neutral position; and further wherein one of said disks is removed from a corresponding tray and positioned on a turntable by said means for removing and playing disks for playback by one of said players while another of said disks is being played by the other of said players.

3. An automatic disk changer including a case having a pair of side portions, wherein tray guides are provided on a large number of levels in order to house trays containing disks; a pair of guide rails are provided at both the side portions of said case; a tray transfer means is provided to pull out said tray from said tray guide and then transfer said tray, said tray transfer means including a pair of right and a pair of left guide rollers provided at opposite sides of each of said rails for guiding up and down movement of said tray transfer means along said rails, and additional right and left guide rollers, are put into elastic contact with said rails in directions perpendicular to the former pair of right and left guide rollers; timing belts are endlessly wound at both the side portions of said case and secured at central portions of said belts to said tray transfer means; and a disk player is installed to play said disk in said tray optionally transferred by said tray transfer means.

4. An automatic disk changer for storing, selecting, and playing disks having information stored therein, comprising:
   a case having a right side and a left side and including right and left corner portions formed by intersecting structural walls;
   a plurality of trays, each for holding a disk;
   tray storage means for storing said trays and the disks thereon; said tray storage means comprising at least one pair of right tray guides, defining a center line therebetween and positioned within and on the right side of said case at said right corner portion, for receiving one of said trays, and at least one pair of left tray guides, defining a center line therebetween and positioned within and on the left side of said case at said left corner portion, for receiving one of said trays;
   a disk player positioned within said case for receiving, playing and returning a disk delivered thereto; and
   tray transfer means for selectively extracting a tray from any of said right and left tray guides and delivering the disk on said selected tray to said disk player, and for receiving a disk from said disk player and returning said disk and a tray holding said disk to a selected pair of right or left tray guides; said right and left tray guides and said tray transfer means being positioned in said case so that center lines of said two pair of guides extend generally from the respective right and left corner portions toward said tray transfer means and intersect at a V shaped angle of less than 180°; wherein said tray transfer means comprises a single tray gripping means which is operative to move between three positions including a first tray gripping position corresponding to said pair of right tray guides, a second tray gripping position corresponding to said pair of left tray guides, and a neutral position.

5. An automatic disk changer as claimed in claim 4, wherein said tray storage means further comprises;
   a stack of pairs of right tray guides, including said at least one pair of right tray guides; said pair of right tray guides in said stack being positioned in a column, each said pair being at a different level than all other pairs in said stack; and
   a stack of pairs of left tray guides, including said at least one pair of left tray guides; said pair of left tray guides in said stack being positioned in a column, each said pair being at a different level than all other pairs in said stack.

6. An automatic disk changer as claimed in claim 5 further comprising;
   tray transfer movement means for moving said tray transfer means along an axis parallel to said columns of pairs of tray guides to allow positioning of said tray transfer means at any level on which there is a pair of right tray guides and a pair of left tray guides.

7. An automatic disk changer as claimed in claim 6, further comprising;
   a second disk player positioned within said case for receiving, playing and returning a disk delivered thereto;
   said first and second disk players being positioned adjacent opposite ends of said columns of tray guides, whereby said tray transfer means under control of said tray transfer movement means can select a tray from said tray storage means and deliver said selected tray and disk thereon to either of said disk players while the other of said disk players is playing a different disk.

8. An automatic disk changer as claimed in claim 7, wherein said tray transfer movement means comprises:
   a pair of endless timing belts, each on opposite sides of said tray transfer means and each attached at a respective point thereon to said tray transfer means;
   a pair of guide rails on each side of said tray transfer means, respectively, for guiding the movement of said tray transfer means along said axis; and
   means for revolving said timing belts to cause said tray transfer means to move along said guide rails along said axis.

9. An automatic disk changer as claimed in claim 8, wherein said tray transfer means further comprises six guide rollers, three on each side of said tray transfer means and all six abutting a guide rail on the same respective side as the guide rollers; on each side, said three rollers abutting three respective sides of said guide rail, with the one of said rollers abutting the side facing said tray transfer means being in elastic contact with said side.

* * * * *